US008042428B2

(12) United States Patent
Shimizu et al.

(10) Patent No.: US 8,042,428 B2
(45) Date of Patent: Oct. 25, 2011

(54) CABLE CONNECTION STRUCTURE

(75) Inventors: Toshihiro Shimizu, Chiryu (JP); Atsuki Sasaki, Nagoya (JP); Seiya Nishimura, Okazaki (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 336 days.

(21) Appl. No.: 12/438,861

(22) PCT Filed: Jun. 14, 2007

(86) PCT No.: PCT/JP2007/062013
§ 371 (c)(1),
(2), (4) Date: May 6, 2009

(87) PCT Pub. No.: WO2008/026362
PCT Pub. Date: Mar. 6, 2008

(65) Prior Publication Data
US 2009/0315371 A1    Dec. 24, 2009

(30) Foreign Application Priority Data

Aug. 31, 2006  (JP) .................................. 2006-235347

(51) Int. Cl.
*B60N 2/42*  (2006.01)
*F16C 1/10*  (2006.01)
*F16C 1/26*  (2006.01)
(52) U.S. Cl. ................. 74/502.4; 74/500.5; 74/501.5 R; 74/501.6; 74/502.6; 74/503; 297/216.12; 297/463.1
(58) Field of Classification Search ............ 297/261.12, 297/463.1; 74/502.4, 502.6, 500.5, 501.5 R, 74/501.6, 503, 488, 489, 523, 483 PB
See application file for complete search history.

(56) References Cited

U.S. PATENT DOCUMENTS

| 4,241,687 A * | 12/1980 | DuBois et al. .................. 440/63 |
| 4,637,655 A | 1/1987 | Fourrey et al. |
| 2008/0246323 A1 | 10/2008 | Kuno |
| 2008/0252128 A1 | 10/2008 | Nishikawa et al. |
| 2009/0102266 A1 | 4/2009 | Furukawa et al. |
| 2009/0126520 A1 | 5/2009 | Yamaguchi et al. |

FOREIGN PATENT DOCUMENTS

DE           722661          7/1942
(Continued)

OTHER PUBLICATIONS

English language Abstract of JP 2001-208036 A, Aug. 3, 2001.
(Continued)

*Primary Examiner* — Peter Brown
*Assistant Examiner* — Philip Gabler
(74) *Attorney, Agent, or Firm* — Greenblum & Bernstein, P.L.C.

(57) ABSTRACT

An operation cable has an operational structure in which an inner member inserted into a tubular outer member is pulled from a lower end side thereof. The operation cable having a double layer structure is axially connected to a double layer cable that is constructed from a stay of a headrest and a push rod inserted into the tubular stay. In particular, the stay is inserted into a support positioned on an upper portion of the seat back, a lower end of the stay and an upper end of the inner member are axially connected to each other, so that a lower end of the push rod in the tubular stay and a head portion of the outer member are positioned closer to each other. As a result, the push rod can be pushed by the head portion of the outer member when the operation cable is pulled.

6 Claims, 14 Drawing Sheets

FOREIGN PATENT DOCUMENTS

| | | |
|---|---|---|
| EP | 0 174 884 A1 | 3/1986 |
| FR | 2568528 A1 | 2/1986 |
| JP | 61-92620 A | 5/1986 |
| JP | 5-32820 U | 4/1993 |
| JP | 2001-208036 A | 8/2001 |
| JP | 2003-299549 A | 10/2003 |
| JP | 2005-022548 | 1/2005 |
| JP | 2005-087650 A | 4/2005 |
| JP | 2005-104259 A | 4/2005 |
| JP | 2005-212596 A | 8/2005 |

OTHER PUBLICATIONS

English language Abstract of JP 2005-087650 A, Apr. 7, 2005.
English language Abstract of JP 2005-212596 A, Aug. 11, 2005.
English language Abstract of JP 2003-299549 A, Oct. 21, 2003.
English language machine translation of JP 5-32820 U, Apr. 30, 1993.
English language Abstract of JP 2005-104259 A, Apr. 21, 2005.
U.S. Appl. No. 12/210,529 to Furukawa et al., filed Sep. 15, 2008.
U.S. Appl. No. 12/259,612 to Suzuki et al., filed Oct. 28, 2008.
U.S. Appl. No. 12/356,866 to Abe, filed Jan. 21, 2009.
U.S. Appl. No. 12/438,784 to Nishiura et al., filed Feb. 25, 2009.
U.S. Appl. No. 12/438,870 to Shimizu et al., filed Feb. 25, 2009.
U.S. Appl. No. 12/415,025 to Matsui, filed Mar. 31, 2009.
U.S. Appl. No. 12/426,540 to Otsuka, filed Apr. 20, 2009.

* cited by examiner

CABLE CONNECTION STRUCTURE

TECHNICAL FIELD

The present invention relates to a cable connection structure. More particularly, the present invention relates to a cable connection structure in which two cables are axially connected to each other.

BACKGROUND ART

Conventionally, there is a vehicle seat having a mechanism that is capable of instantaneously moving a headrest forwardly so as to support a head of a sitting person when a vehicle back-side collision happens. An operation mechanism for moving the headrest forwardly as described above is known. The operation mechanism uses an operation cable that is pulled by a seat back loading that is applied to a seat back by the sitting person when the vehicle back-side collision happens.

This operation cable, for example, has a double layer structure in which a linear inner member is inserted into a flexible tubular outer member. The operation cable is disposed so as to extend from inside of the headrest to inside of the seat back through a stay that may function as a support pillar thereof. Therefore, in a case that the headrest is constructed to be detachable with respect to the seat back, it is necessary to take various structural measures in order to dispose the operation cable. For example, the operation cable can be divided to two portions. The divided portions are respectively previously disposed in the headrest and the seat back, so that end portions thereof are connected to each other when the headrest is attached to the seat back.

Japanese Laid-Open Patent Publication No. 2003-299549 teaches a technique in which electrical cables separately disposed within a headrest and a seat back can be connected to each other during headrest attaching operation. According to this technique, one of the electrical cables is inserted into a tubular stay of the headrest. A connection terminal of the cable is retained at a lower end of the stay. Conversely, the other of the electrical cables is also inserted into a cylindrical stay-insertion support that is disposed in an upper portion of the seat back. A connection terminal of the cable is retained within the cylindrical support while maintained in a standby condition for connection. Thus, the connection terminals of both of the electrical cables can be axially integrally connected to each other when the stay is inserted into the cylindrical support.

DISCLOSURE OF THE INVENTION

Problem to be Solved by the Invention

However, it is difficult to use the conventional technique taught by the above-mentioned publication as a technique for axially connecting double layer cables to each other. This is because, in the double layer cables, the cables must be connected to each other such that their inner members can be axially pushed and pulled within their outer members. However, if each of the cables has a push-type structure in which the inner member is pushed out of the outer member, it is possible to relatively easily attain a substantial axial connection condition of the cables. That is, connection ends of the outer members can be connected to each other while connection ends of the inner members contact with each other in an axial direction. Thus, the inner members can be placed in the axial connection condition in which a force can be transmitted therebetween when the inner member is pushed out. However, in such a push-type cable structure, the inner members must have relatively high rigidity. Such cables cannot be easily bent. Therefore, it is rather difficult to handle the cables in order to dispose the same. As a result, operation cables that are disposed in the seat back may preferably have a pull-type cable structure as possible.

The present invention has been made in order to solve the above-mentioned problem. It is an object of the present invention to enable double layer cables having different structures in push and pull types to be axially connected such that a force can be transmitted therebetween.

Means for Solving the Problem

In order to solve the above-mentioned problem, a cable connection structure of the present invention uses a following means.

First, a first invention is a cable connection structure for axially connecting a first cable and a second cable to each other. The first cable has a double layer structure in which an inner member capable of moving by pulling operation is axially inserted into a tubular outer member, and has a pull-type cable structure in which the inner member can be operated in such a direction as to be pulled from the outer member at an opposite end portion opposite to a connection end portion that is connected to the second cable. The second cable has a double layer structure in which an inner member capable of moving by pushing operation is axially inserted into a tubular outer member, and has a push-type cable structure in which the inner member can be operated in such a direction as to be axially pushed into the outer member at a side of a connection end portion that is connected to the first cable. Axial connection of the first cable and the second cable is performed by a connection structure that includes an axial connection condition in which the inner member of the first cable and the outer member of the second cable are integrally connected to each other so as to be prevented from axially moving relative to each other and a condition in which connection end portions of the outer member of the first cable and the inner member of the second cable contact each other. In the axial connection condition in which the inner member of the first cable and the outer member of the second cable are connected, when the inner member of the first cable is pulled from a side of the opposite end portion thereof, the outer member is axially relatively pushed out at a side of the connection end portion of the first cable, so that the connection end portion of the inner member of the second cable is axially pushed by a head portion of the outer member that is pushed out.

According to the first invention as described above, when the first cable and the second cable each having a double structure are axially moved such that the connection end portions thereof are axially overlapped, the first cable and the second cable are axially connected to each other, so that axial cable operational forces thereof can be mutually transmitted therebetween. In particular, when the first cable and the second cable are axially moved described above, the inner member of the first cable and the outer member of the second cable are integrally connected to each other so as to be prevented from axially moving relative to each other. Further, the connection end portions of the outer member of the first cable and the inner member of the second cable contact each other. As a result, the first cable can transmit a pulling operational force produced from the inner member being pulled at the side of the opposite end portion as a pushing operational force that can axially push the connection end portion of the inner member of the second cable via the head portion of the outer member at the side of the connection end portion.

Next, in a second invention related to the first invention, the axial connection of the first cable and the second cable is performed via a cylindrical connection member the is axially connected to a stationary member. The connection end portions of the first cable and the second cable are shaped so as to be inserted into the cylindrical connection member. The connection end portion of the inner member of the first cable is provided with a radially outwardly projected engagement projection that constitutes the connection structure, and the tubular outer member of the first cable is provided with a cutout that allows the engagement projection to project radially outwardly therethrough and to relatively move axially therealong. A circumferential wall of the connection end portion of the tubular outer member of the second cable is formed with an axially extended reception groove that constitutes the connection structure. The reception groove is capable of axially receiving the engagement projection provided to the connection end portion of the inner member of the first cable. The first cable is constructed such that when the connection end portion of the first cable is inserted axially into the cylindrical connection member from one side, the engagement projection provided to the connection end portion of the inner member thereof can be axially moved along an insertion groove that is formed in the connection member. The insertion groove formed in the connection member is shaped such that an axial terminal end portion of the insertion groove into which the engagement projection is inserted is bent in a circumferential direction. The reception groove formed in the connection end portion of the outer member of the second cable is shaped such that an axial terminal end portion of the reception groove that receive the engagement projection is bent in an opposite circumferential direction opposite to the terminal end portion of the insertion groove. When the connection end portion of the first cable is axially inserted into the cylindrical connection member from one side thereof and the engagement projection provided to the connection end portion of the inner member of the first cable reaches the circumferentially bent terminal end portion of the insertion groove that is formed in the connection member, the first cable is maintained in a condition in which axial movement of the first cable with respect to the connection member is restrained. The connection end portion of the second cable is axially inserted into the cylindrical connection member retaining the connection end portion of the first cable from the other side thereof, the engagement projection retained in the terminal end portion of the insertion groove of the connection member is axially received by the reception groove formed in the connection end portion of the outer member of the second cable. When the second cable is further inserted into the cylindrical connection member, the engagement projection is pushed in the opposite circumferential direction from the terminal end portion of the insertion groove while guided by the circumferentially oppositely bent terminal end portion of the reception groove that is formed in the outer member of the second cable, so as to reach the terminal end portion of the reception groove, and as a result, the engagement projection is released from a condition in which axial movement thereof with respect to the connection member is restrained and is placed in a condition in which axial movement thereof with respect to the outer member of the second cable is restrained, thereby providing the axial connection condition in which the inner member of the first cable and the outer member of the second cable can be integrally connected so as to axially move while integrated with each other.

According to the second invention, when the connection end portion of the first cable is inserted into the cylindrical connection member, the engagement projection provided to the connection end portion of the inner member engages the insertion groove formed in the circumferential wall of the connection member, so that the first cable can be maintained in am inserted condition. When the engagement projection is inserted to the terminal end portion of the insertion groove that is bent in the circumferential direction, the engagement projection is maintained in a condition in which axial movement thereof is restrained. Further, in this restrained condition, when the connection end portion of the second cable is axially inserted into the cylindrical connection member from the other side thereof, the engagement projection is axially received in the reception groove that is formed in the connection end portion of the outer member of the second cable. Further, when the second cable is further inserted into the cylindrical connection member, the engagement projection is pushed in the opposite circumferential direction while guided by the terminal end portion of the reception groove. As a result, the engagement projection is removed from the terminal end portion of the insertion groove so as to be positioned in an axially extended portion of the insertion groove, and as a result, the engagement projection is released from the restraint condition in which the axial movement thereof is restrained. Further, at the same time, the engagement projection is positioned in the circumferentially oppositely bent terminal end portion of the reception groove. Thus, the engagement projection is placed in the condition in which axial movement thereof with respect to the outer member of the second cable is restrained, thereby providing the axial connection condition in which the inner member of the first cable and the outer member of the second cable can be axially integrally connected to each other.

Next, in a third invention related to the second invention, the connection structure axially connecting the inner member of the first cable and the outer member of the second cable is constructed such that when the connection end portion of the second cable is moved in such a direction as to be pulled from the connection member in the axial connection condition, the engagement projection retained in the terminal end portion of the reception groove formed in the outer member of the second cable is pushed in one circumferential direction from the terminal end portion of the reception groove while guided by the terminal end portion of the insertion groove that is formed in the connection member, so as to reach the terminal end portion of the insertion groove, and as a result, the engagement projection is released from a condition in which axial movement thereof with respect to the outer member of the second cable is restrained, so that the axial connection condition can be canceled.

According to the third invention, when the second cable is moved in such a direction as to be pulled from the connection member in the axial connection condition in which the inner member of the first cable and the outer member of the second cable are axially integrally connected to each other, the engagement projection is pushed in the circumferential direction while guided by the terminal end portion of the insertion groove. As a result, the engagement projection is removed from the terminal end portion of the reception groove so as to be positioned in an axially extended portion of the reception groove, and as a result, the engagement projection is placed in the condition in which axial relative movement thereof with respect to the outer member of the second cable is allowed. That is, the axial connection condition is canceled.

Further, in a fourth invention related to the second or third invention described above, the terminal end portion of at least one of the insertion groove formed in the connection member and the reception groove formed in the outer member of the second cable is shaped so as to be circumferentially curved.

According to the fourth invention, because the terminal end portion of the insertion groove and the reception groove are circumferentially curved, axial or peripheral movement of the engagement projection into the grooves can be smoothly performed.

Next, in a fifth invention related to any of the second to fourth inventions described above, a plurality of engagement projections are formed in the connection end portion of the inner member of the first cable so as to be axisymmetrical with each other, and wherein a plurality of insertion grooves and reception grooves that engage the engagement projections are axisymmetrically formed so as to correspond to the engagement projections.

According to the fifth invention, an engagement force produced by the engagement projections can be circumferentially uniformly applied to the connection member and the second cable.

Next, in a sixth invention related to any of the second to fifth inventions described above, the first cable is disposed in a seat back of a vehicle seat and the second cable is disposed in a tubular stay of a headrest that is attached to an upper portion of the seat back. A cylindrical support into which the stay is inserted is disposed on the upper portion of the seat back as the connection member. When the connection end portion of the first cable is inserted into the cylindrical support from below, the engagement projection formed in the connection end portion of the inner member thereof engages the terminal end portion of the insertion groove that is formed in the support, so that the first cable is maintained in a condition in which the first cable is suspended in the cylindrical support. The tubular stay is formed as the outer member of the second cable and a push rod as the inner member is inserted into the tubular stay. When the tubular stay is inserted into the cylindrical support from above, the engagement projection formed in the connection end portion of the inner member of the first cable is inserted into the reception groove formed in a lower end portion of the stay so as to engage the terminal end portion thereof, and as a result, the inner member of the first cable and the stay can be axially connected, so as to be positioned in the axial connection condition in which the inner member and the stay can axially move while integrated with each other, and a head portion formed in the outer member of the first cable is positioned closer to a lower end portion of the push rod that is inserted in the tubular stay, so that the head portion and the push rod can be positioned in an axial connection condition in which the head can axially push the push rod. When the stay is pulled from the support from above, the axial connection condition of the inner member of the first cable and the stay is canceled.

According to the sixth invention, when the stay of the headrest is inserted into the cylindrical support disposed on the upper portion of the seat back, the inner member of the first cable and the stay can be axially connected, so as to be positioned in the axial connection condition in which they can axially move while integrated with each other. Further, when the stay is pulled from the support, the axial connection condition described above is canceled.

Next, in a seventh invention related to the sixth invention, the headrest is constructed such that a support portion for receiving a head of a sitting person can move relative to the seat back in a direction toward the head when vehicle back-side collision happens. The first cable and the second cable are provided as a transmission member for transmitting a mechanical operational movement detected when the vehicle back-side collision happened to a mechanical portion for moving the support portion.

According to the seventh invention, due to the connection structure in which the first cable and the second cable are separable from each other, the stay can be freely inserted into and pulled from the support. In this axial connection condition of the first cable and the second cable, the axial cable operational force input from the first cable can be appropriately transmitted to the second cable.

Effect of the Invention

The means described above may provide following effects.

First, according to the first invention, the inner member of the pull-type first cable and the outer member of the push-type second cable are axially connected to each other such that a pulling operational force produced from the inner member being pulled can be transmitted to the end portion of the inner member of the second cable as a pushing operational force via the head portion of the outer member. Therefore, double layer structured cables having different structures in push and pull types can be axially connected to each other such that a force can be transmitted therebetween.

Further, according to the second invention, the connection end portion of the inner member of the first cable is provided with the engagement projection. Further, the connection member and the outer member of the second cable are formed with the grooves that are respectively circumferentially oppositely bent. Therefore, it is possible to easily provide a construction in which the two cables are axially connected each other by axially overlapping the connection end portions thereof.

Further, according to the third invention, the connection member and the outer member of the second cable are formed with the grooves that are respectively circumferentially oppositely bent. Therefore, it is possible to provide a construction in which the two cables are separated from each other by moving the connection end portions thereof relative to each other in such a direction as to be pulled from each other.

Further, according to the fourth invention, the circumferentially bent portions of the insertion groove and the reception groove that movably receive the engagement projection are curved. Therefore, the two cables can be smoothly axially moved.

Further, according to the fifth invention, a plurality of engagement projections, insertion grooves and reception grooves are formed so as to be axisymmetrical with each other. Therefore, the two cables can be smoothly moved axially without producing any deflection.

Further, according to the sixth invention, the mutually-separable cable connection structure is applied to an insertion connection portion of the stay of the headrest and the support of the seat back. Therefore, the cables can be easily axially connected to each other and separated from each other by inserting the stay into the support or pulling the stay from the support.

Further, according to the seventh invention, the mutually-separable cable connection structure is applied to a transmission mechanism that is constructed to transmit power to a mechanical portion for moving the headrest toward the head when the vehicle back-side collision happens. Therefore, the axial cable operational force input from the first cable can be appropriately transmitted to the second cable when the vehicle back-side collision happens, so that the headrest can be appropriately moved toward the head.

Figure 1:
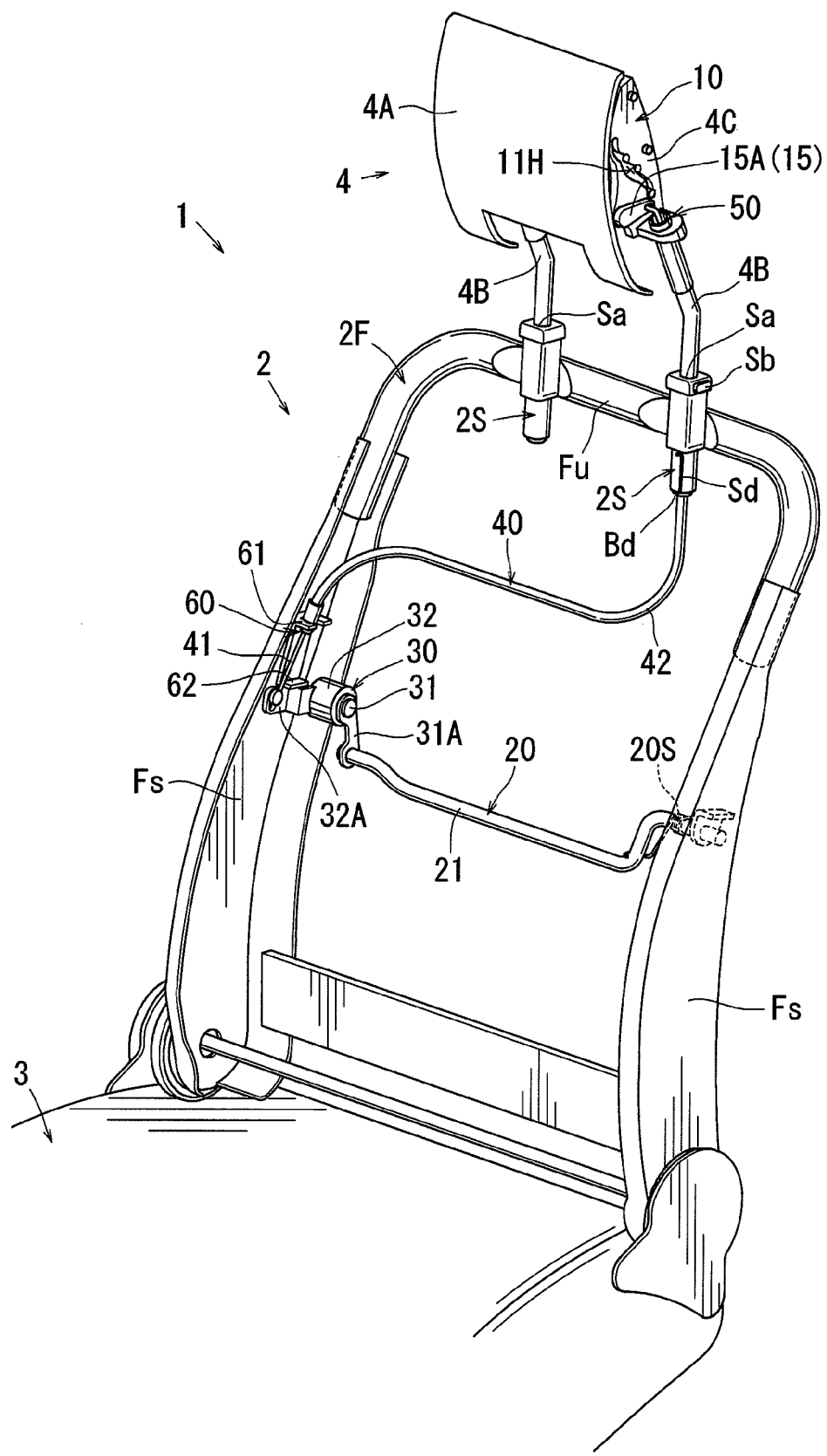
FIG. 1 is a perspective view of a vehicle seat according to Embodiment 1, which schematically illustrates construction thereof.

DESCRIPTION OF SYMBOLS 1 vehicle seat
2 seat back
2F back frame (stationary member)
Fu upper frame
Fs side frame
2S support
Sa insertion port
Sb knob
St engagement claw
Sd insertion groove
3 seat cushion
4 headrest
4A support portion
4B stay (outer member of second cable)
Bk engagement groove
Bd reception groove
4C headrest base portion
10 headrest moving mechanism
11B rear surface portion
11D bottom surface portion
11S side surface portion
11U top surface portion
11R rib
11H elongated hole
H0 lower end portion
H1 first stopper groove
H2 second stopper groove
H3 upper end portion
12 connection link
12A connection shaft
12B connection shaft
13 support member
13A connection shaft
14 hook
14A connection shaft
14B upper jaw portion
14C lower jaw portion
14D engagement groove
14S torsion spring
15 engagement-disengagement member
15A operation arm portion
15B connection shaft
15C engagement arm portion
15S torsion spring
16 tension spring
17 lever member
17A connection shaft
17B receiving portion
17S torsion spring
20 pressure receiving member
20S torsion spring
21 pressure receiving portion
30 damper
31 rotation shaft
31A connection arm
32 case
32A operation arm
40 operation cable (first cable)
41 inner member
41P engagement projection
42 outer member
42S elongated hole (cutout)
42H head portion
42D bulged portion
50 push rod (inner member of second cable)
60 attachment bracket
61 outer attaching portion
62 stopper

BEST MODE FOR CARRYING OUT THE INVENTION

In the following, the best mode for carrying out the present invention is described with reference to the drawings.

Embodiment 1

First, construction of a cable connection structure according to Embodiment 1 is described with reference to FIGS. 1 to 14. As shown in FIG. 1, the cable connection structure of this embodiment is constructed to connect two cables disposed within a vehicle seat 1 to each other.

FIG. 1 is a perspective view of the vehicle seat 1, which schematically illustrates a structure thereof. The vehicle seat 1 is composed of a seat back 2 that functions as a back support of a sitting person, a seat cushion 3 that functions as a seating portion, and a headrest 4 that functions as a head support. In the drawings such as FIG. 1, in order to clarify inner structure of the seat back 2, the headrest 4 and other components, covering structure thereof is omitted.

The headrest 4 has two rod-shaped stays 4B and 4B that are vertically attached to a lower portion thereof. The stays 4B and 4B are respectively inserted into insertion ports Sa formed in cylindrical supports 2S and 2S that are attached to an upper surface portion of the seat back 2, so that the headrest 4 is attached to the upper surface portion of the seat back 2. The supports 2S and 2S are integrally secured to an upper frame Fu. The upper frame Fu may form an upper arm portion of a back frame 2F that constitutes a framework of the seat back 2. The upper frame Fu is integrally and rigidly connected to both of side frames Fs and Fs, so as to connect upper end portions of the side frames Fs and Fs. Further, the back frame 2F corresponds to a stationary member of the present invention.

The headrest 4 is normally retained in its predetermined position, so as to catch the head of the sitting person at a rear side position thereof. However, the headrest 4 is constructed such that when a vehicle back-side collision happens, a support portion 4A can instantaneously move forwardly, so as to move closer to the head. The support portion 4A is positioned at a front side of the headrest 4 and is constructed to catch the head. That is, the headrest 4 is constructed such that when the vehicle back-side collision, only the support portion 4A of the headrest 4 can move to a position immediately behind the back of the head of the sitting person that has a posture in which the body is forwardly spaced from the seat back 2 and the headrest 4. Thus, when the vehicle back-side collision happens, rearward inclination of the head can be quickly prevented. As a result, a loading applied to the neck can be reduced, so that a whiplash injury can be prevented.

Figure 5:
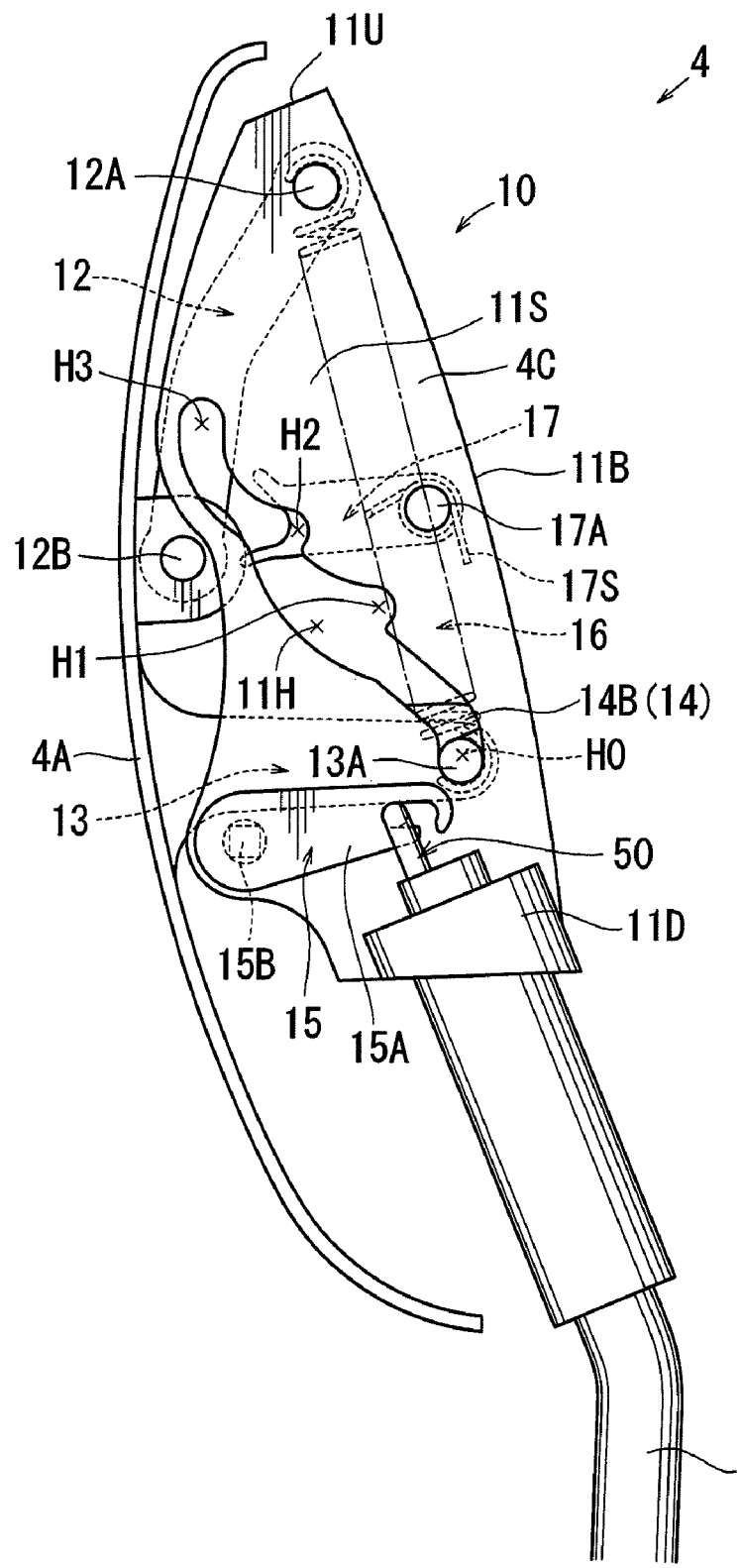
FIG. 5 is a side view, which illustrates a condition in which a support portion of the headrest is retained in an initial position.

Motion to move the support portion 4A forwardly when the vehicle back-side collision happens can be performed by a headrest moving mechanism 10 that is incorporated into the headrest 4. As shown in FIG. 5, in a normal condition in which the vehicle back-side collision does not yet happen, the headrest moving mechanism 10 retains the support portion 4A in a posture of an initial position thereof while maintaining the support portion 4A in a forward movement restraint condition. Further, the support portion 4A is normally biased in a forward moving direction, i.e., in a direction toward the head, by a tension spring 16 that is positioned between the support portion 4A and a headrest base portion 4C integrated with the stays 4B and 4B. Therefore, in the normal condition in which the vehicle back-side collision does not yet happen, the support portion 4A is retained in the initial position against a biasing force of the tension spring 16.

Figure 8:
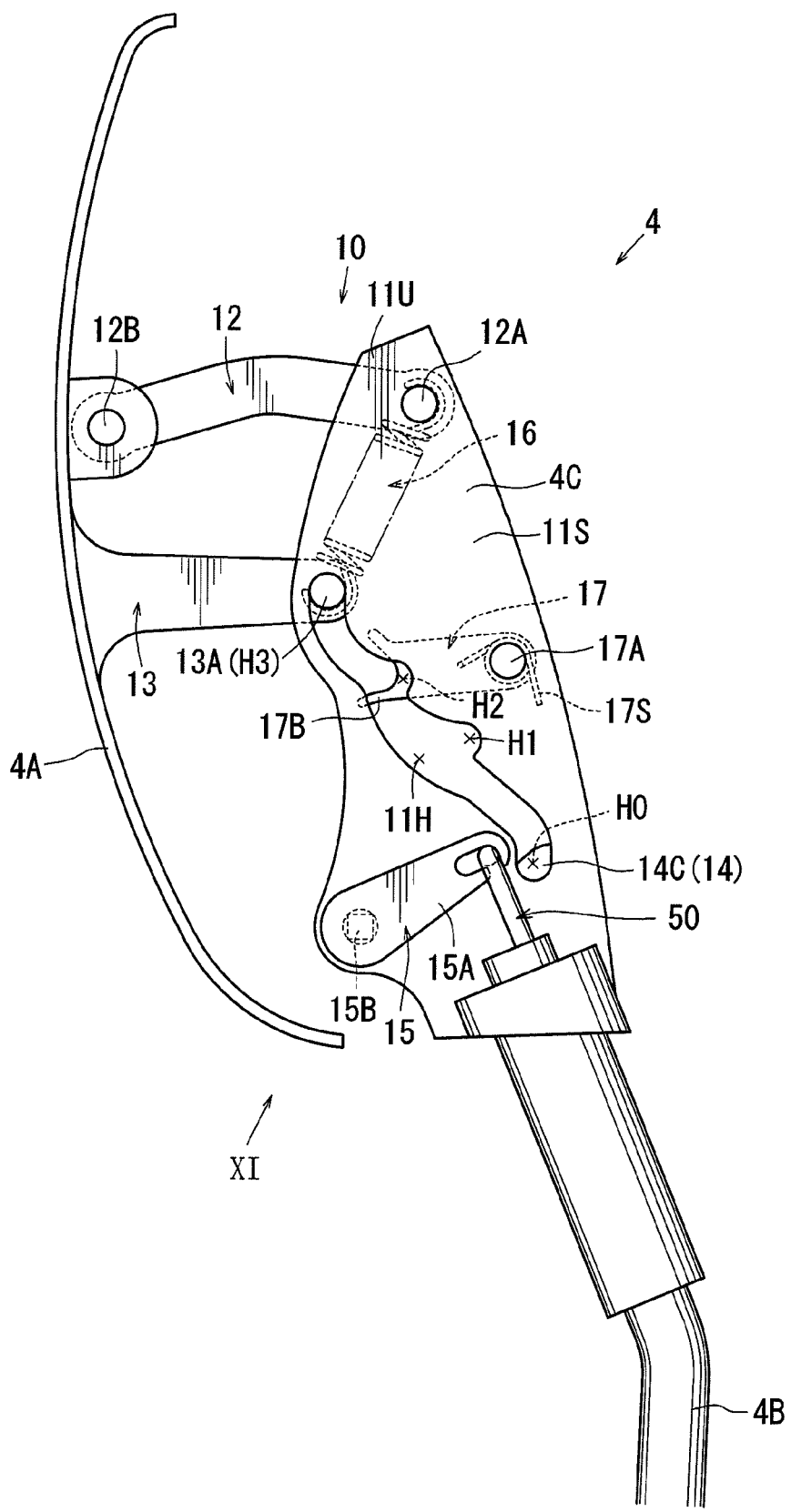
FIG. 8 is a side view, which illustrates a condition in which the support portion of the headrest reaches a position closer to the head.

When the vehicle back-side collision happens and the movement restraint condition of the support portion 4A is canceled, the headrest moving mechanism 10 can move the support portion 4A forwardly by the biasing force of the tension spring 16. In particular, the headrest moving mechanism 10 can move the support portion 4A forwardly and upwardly along profiles of elongated holes 11H and 11H formed in the headrest base portion 4C which will be described hereinafter, thereby moving the support portion 4A to the position immediately behind the back of the head (a collision preparatory position) as shown in FIG. 8. The headrest moving mechanism 10 is constructed such that in the condition in which the support portion 4A is moved to the collision preparatory position, the support portion 4A cannot be pushed back even if the support portion 4A is applied with a loading caused by the rearward inclination of the head when the vehicle back-side collision happens. As a result, the head of the sitting person can be stably caught by the support portion 4A that is retained in the collision preparatory position.

Referring to FIG. 1 again, an operation of canceling the movement restraint condition of the support portion 4A as described above can be performed by a push up motion of a push rod 50. The push rod 50 is inserted into the right side tubular stay 4B of the headrest 4, as seen in the drawing. Further, the stay 4B as described above corresponds to an outer member of a second cable in the present invention. The push rod 50 corresponds to an inner member of the second cable in the present invention.

Figure 2:
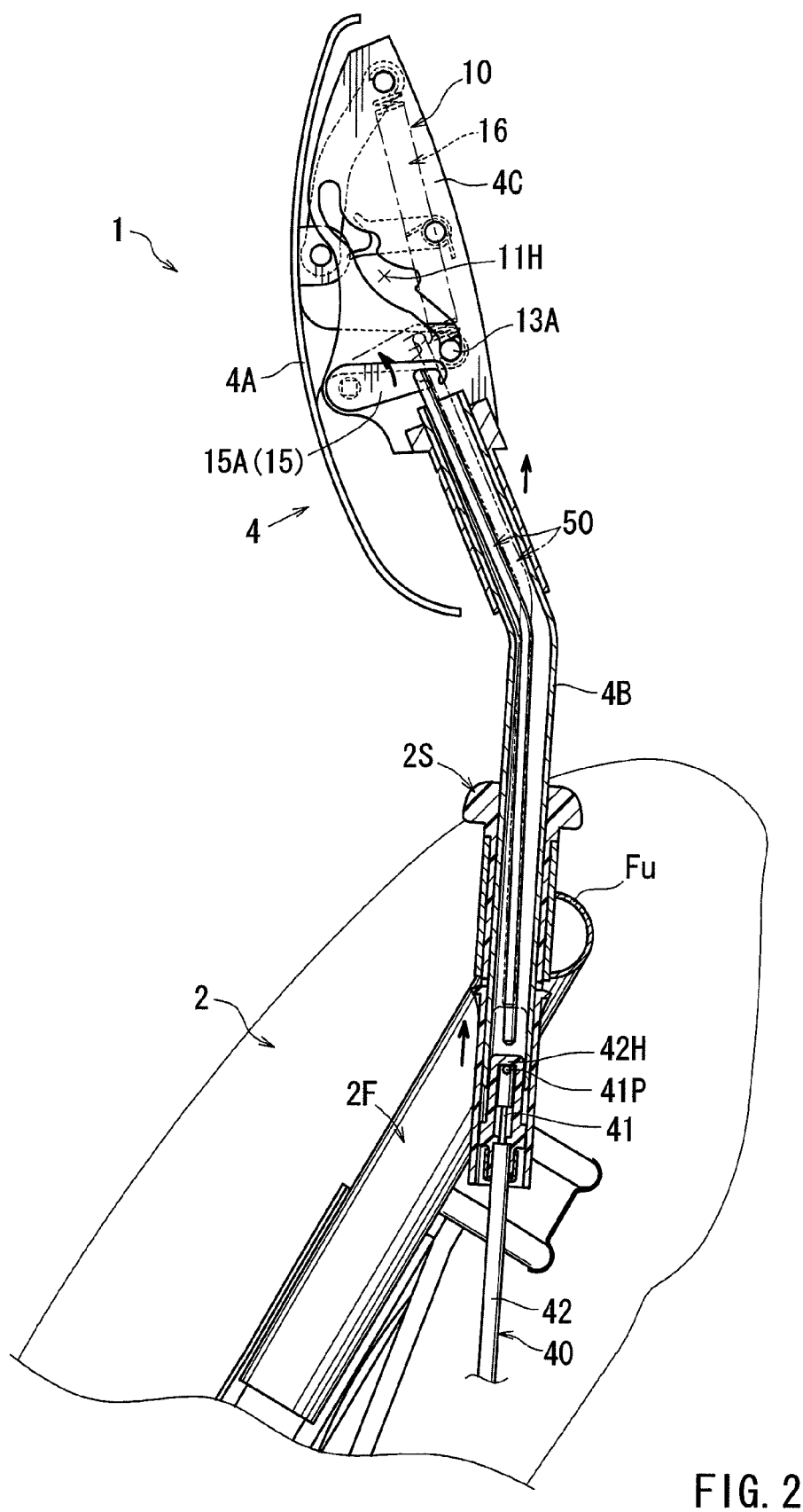
FIG. 2 is a structural diagram, which illustrates a structure in which a push rod is pushed upwardly by an operation cable.
Figure 4:
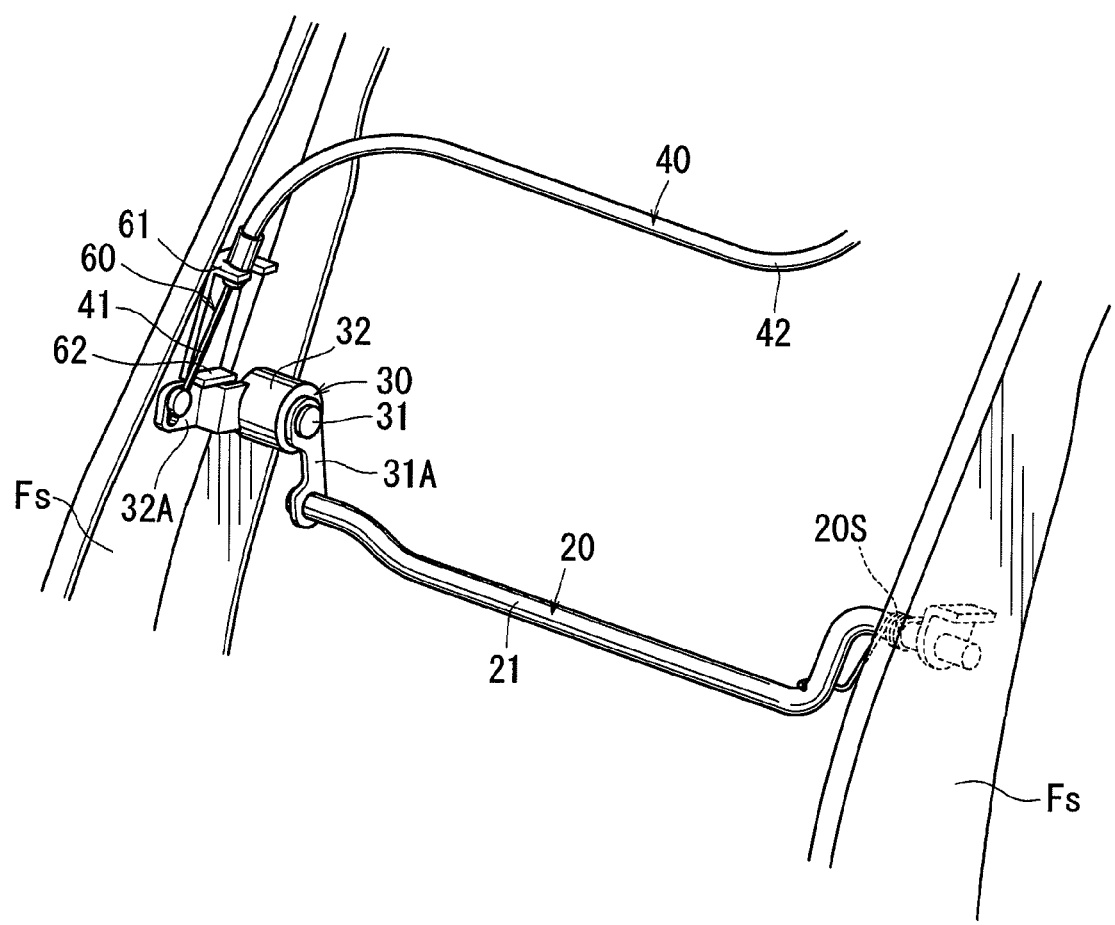
FIG. 4 is an enlarged perspective view of a detection device that can detect a vehicle back-side collision.

As shown in FIG. 2, an upper end portion of the push rod 50 is connected to an engagement-disengagement member 15 that is provided as an operation member of the headrest moving mechanism 10. Further, a lower end portion of the push rod 50 is connected to an upper end portion of an operation cable 40 that is disposed inside the seat back 2. Further, the operation cable 40 corresponds to a first cable in the present invention. As shown in FIG. 4, a lower end portion of the operation cable 40 is connected to a pusher member 20 that is disposed in the seat back 2, so that the operation cable 40 can be pulled downwardly when the vehicle back-side collision happens. The pusher member 20 may function as a detection device of the vehicle back-side collision. Further, as shown in FIG. 2, the operation cable 40 is constructed such that when its lower end portion is pulled, a corresponding operational force is transmitted to its upper end portion in reverse, thereby pushing up the push rod 50.

Further, when the push rod 50 is pushed up, the engagement-disengagement member 15 is pushed and rotated counterclockwise as seen in the drawing, so that the movement restraint condition of the support portion 4A can be canceled.

In the following, construction of the above-mentioned detection device of the vehicle back-side collision, i.e., the detection device for pushing up the push rod 50 when the vehicle back-side collision happens, is described.

As shown in FIG. 4, a bent rod-shaped pressure receiving member 20 is disposed in the seat back 2 so as to be positioned in a middle portion thereof. The pressure receiving member 20 is positioned so as to extend in a width direction. A right end portion of the pressure receiving member 20 as seen in the drawing is rotatably supported on a right side frame Fs of the seat back 2. Further, a left end portion of the pressure receiving member 20 as seen in the drawing is rotatably supported on a left side frame Fs via a rotary type damper 30.

Formed in a widthwise middle portion of the pressure receiving member 20 is a pressure receiving portion 21 that capable of receiving a seat back loading applied by the sitting person. The pressure receiving portion 21 is formed by bending the right end portion of the pressure receiving member 20 downwardly as seen in the drawing, so as to be offset from a rotation center thereof. Thus, when the pressure receiving portion 21 is pressed rearwardly by the seat back loading applied by the sitting person, the pressure receiving member 20 can be rotated about the both end portions thereof.

Further, a torsion spring 20S is disposed between the right end portion of the pressure receiving member 20 and the side frame Fs. The torsion spring 20S is disposed while it is previously twisted, thereby rotationally biasing the pressure receiving member 20 in such a direction as to push the pressure receiving portion 21 forwardly. As a result, the pressure receiving member 20 is normally maintained in a postural condition in which the pressure receiving portion 21 is pressed against a cushion pad (not shown) that is attached to a seat back surface of the seat back 2.

Further, a well-known rotary type damper is used as the damper 30 that is connected to the left end portion of the pressure receiving member 20. That is, in the damper 30, a rotation shaft 31 is inserted into a cylindrical case 32. The rotation shaft 31 and the case 32 are assembled so as to be rotated relative to each other.

The rotation shaft 31 has a connection arm 31A that is attached to a right end portion thereof as seen in the drawing. The connection arm 31A is integrally connected to the left end portion of the pressure receiving member 20. Further, a left end portion of the rotation shaft 31 as seen in the drawing is rotatably supported by the left side frame Fs. Thus, the case 32 is supported by the rotation shaft 31, so as to be rotatable with respect to the side frame Fs. Further, the case 32 has an operation arm 32A that is attached to an outer circumferential surface thereof. The operation arm 32A is connected to a lower end portion of an inner member 41 of the operation cable 40 which will be described hereinafter. The case 32 is constructed such that when the operation arm 32A contacts a stopper 62 of an attachment bracket 60 that is attached to the side frame Fs, its movement in such a direction as to contact the stopper 62 can be restrained.

The case 32 described above is filled with a viscous fluid such as silicone oil and is hermetically sealed. As a result, when the rotation shaft 31 is urged to rotate relative to the case 32, a viscous resistance is produced therebetween dependent upon a rotating speed thereof. This viscous resistance is applied between the rotation shaft 31 and the case 32. The viscous resistance is increased as the rotating speed of the rotation shaft 31 is increased. Conversely, the viscous resistance is decreased as the rotating speed of the rotation shaft 31 is decreased. When the applied viscous resistance is large, a rotational force of the rotation shaft 31 can be easily transmitted to the case 32. Conversely, when the applied viscous resistance is small, the rotational force of the rotation shaft 31 cannot be not easily transmitted to the case 32.

When the sitting person reclines against the seat back 2, the pressure receiving member 20 and the damper 30 thus constructed may operate as follows.

First, in the normal condition in which the vehicle back-side collision does not yet happen, when the sitting person reclines against the seat back 2, the pressure receiving member 20 is pushed and rotated rearwardly at a relatively gentle speed corresponding to behavior of the sitting person. Therefore, in this case, the rotation shaft 31 can rotate relative to the case 32 at a relatively gentle speed, so that the applied viscous resistance is small. As a result, the rotation shaft 31 idles within the case 32, so that the rotational force of the rotation shaft 31 can not be transmitted to the case 32.

However, when the vehicle back-side collision happens, the sitting person is sharply pressed against the seat back 2 by impact of the collision. At this time, the pressure receiving member 20 is pushed and rotated rearwardly at a relatively high speed corresponding to impulsive motion of the setting person. Therefore, in this case, the rotation shaft 31 can relatively rotate at a relatively high speed, so that the applied viscous resistance is large. As a result, the rotational force of the rotation shaft 31 can be transmitted to the case 32, so that the case 32 can rotate integrally with the rotation shaft 31. Thus, the case 32 can pull the lower end portion of the inner member 41 of the operation cable 40 downwardly because the lower end portion of the inner member 41 is connected to the operation arm 32A.

Further, when the lower end portion of the inner member 41 of the operation cable 40 is pulled, as shown in FIG. 2, the corresponding operational force is transmitted to an upper end portion of the inner member 41, so that the push rod 50 is pushed up within the support 2S.

Next, a transmission mechanism of the operational force transmitted from the operation cable 40 to the push rod 50 is described.

Figure 3:
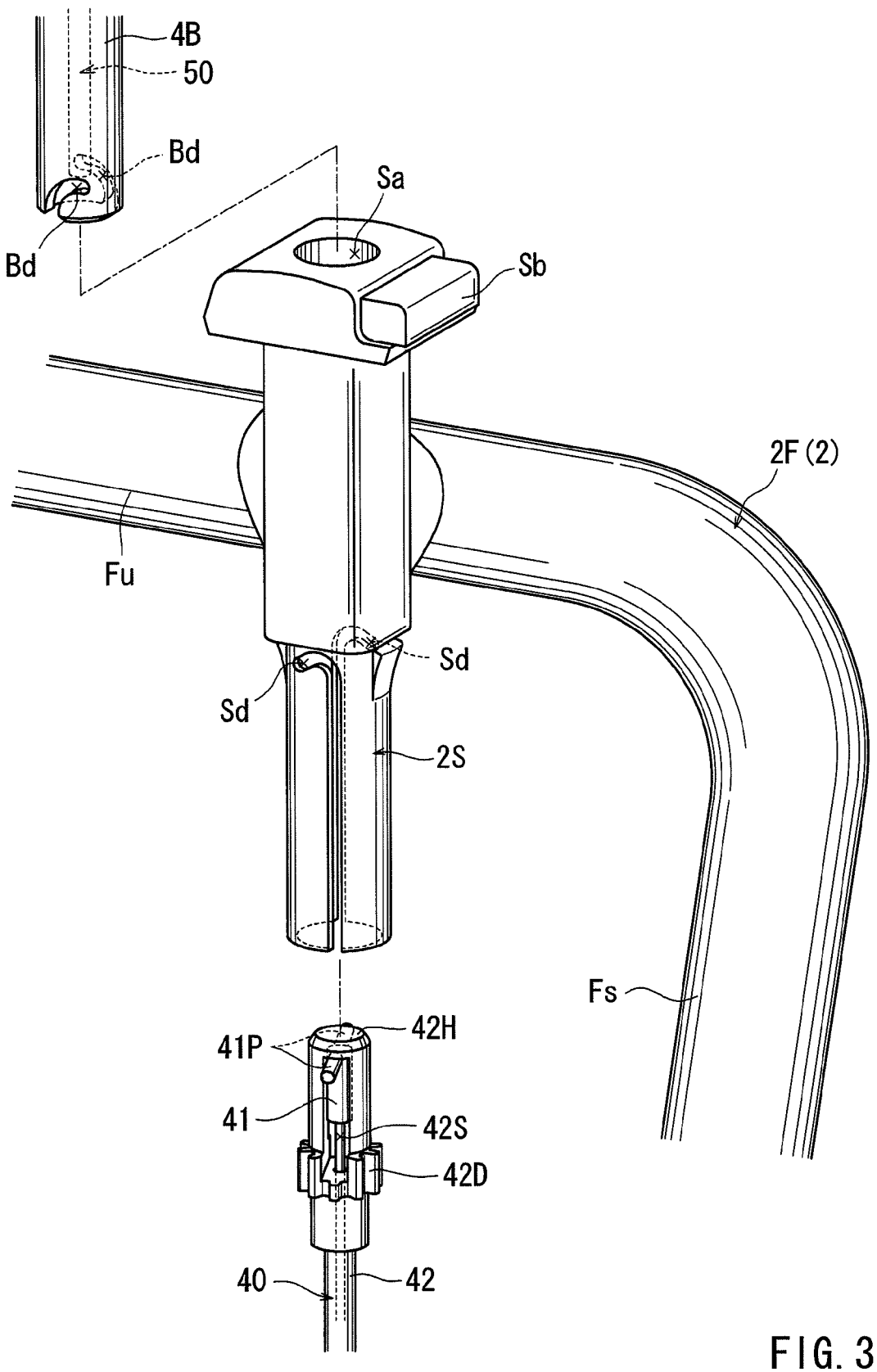
FIG. 3 is an enlarged perspective view, which illustrates an insertion structure in which a stay of a headrest and the operation cable are inserted into a support.

The operation cable 40 has a double layer structure in which the linear inner member 41 is inserted into a flexible tubular outer member 42. The inner member 41 has flexibility greater than the outer member 42. As shown in FIG. 3, the operation cable 40 is disposed inside the seat back 2, and the lower end portion of the inner member 41 is connected to the operation arm 32A of the damper 30 as described above. Further, a lower end portion of the outer member 42 is connected to an outer attaching portion 61 of the attachment bracket 60 that is attached to the left side frame Fs as seen in the drawing. Thus, the operation cable 40 is constructed such that the lower end portion of the inner member 41 is pulled from the lower end portion of the outer member 42 when the vehicle back-side collision happens.

As shown in FIGS. 2 and 3, upon insertion of the upper end portion of the operation cable 40 into the support 2S from below, the operation cable 40 can be assembled to the support 2S so as to push the push rod 50 disposed in the cylindrical stay 4B that is inserted into the cylindrical support 2S from above.

In particular, as shown in FIG. 3, the operation cable 40 is constructed such that T-shaped engagement projections 41P and 41P formed in the upper end portion of the inner member 41 are projected radially outwardly from elongated through holes 42S and 42S that are formed in a circumferential wall of the upper end of the outer member 42. Further, the elongated holes 42S and 42S correspond to the cutout of the present invention.

As a result, the inner member 41 can axially move relative to the outer member 42 within a range corresponding to a range that the T-shaped engagement projections 41P and 41P can move within the elongated holes 42S and 42S. The engagement projections 41P and 41P and the elongated holes 42S and 42S are axisymmetrically formed in two circumferential positions of the inner member 41 and the outer member 42. A head portion 42H is formed in an upper end portion of the outer member 42, so as to close a tubular end portion thereof.

Figure 12:
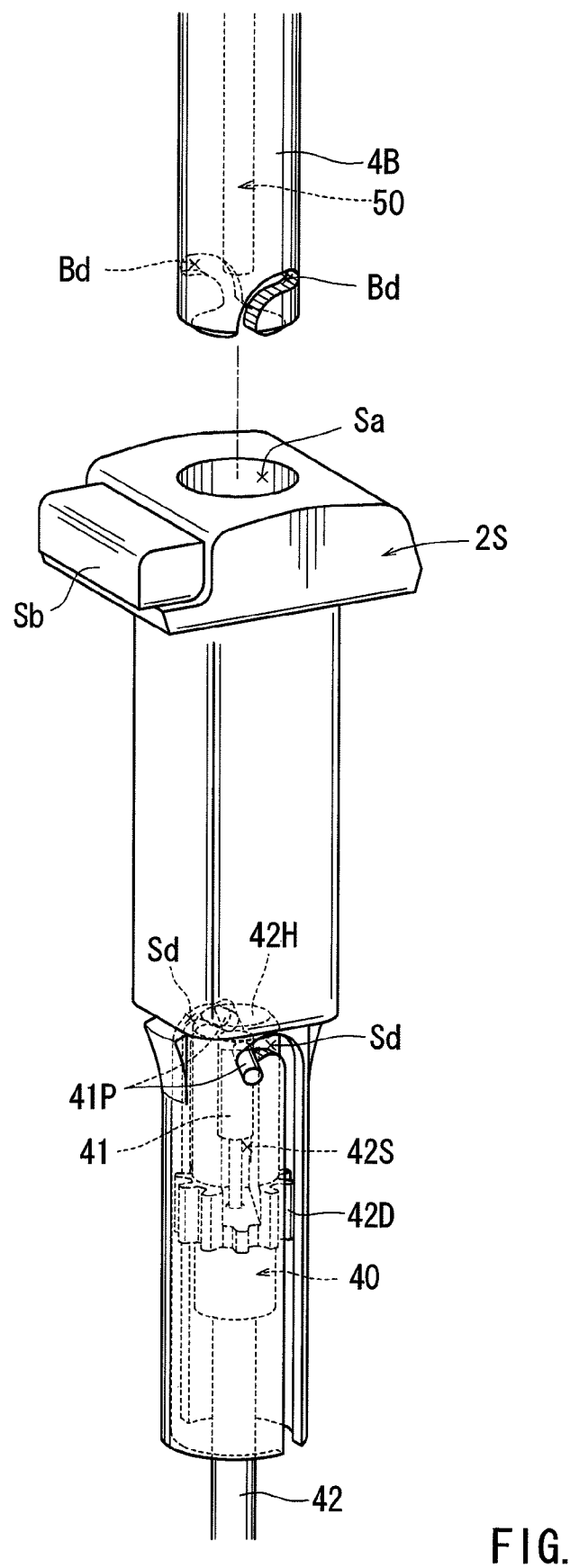
FIG. 12 is a perspective view, which illustrates a condition before the stay is inserted into an insertion port of the support.
Figure 13:
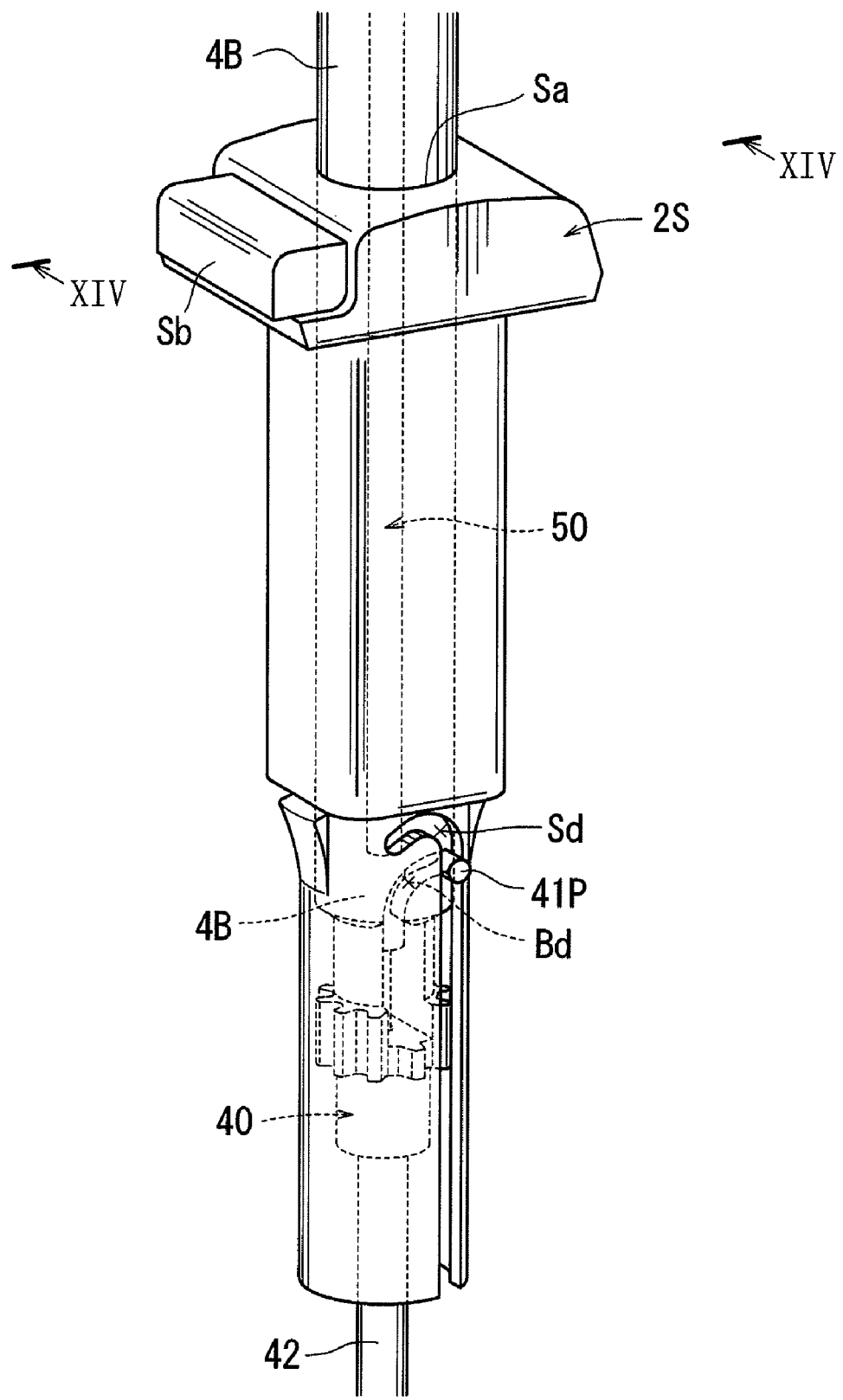
FIG. 13 is a perspective view, which illustrates a condition in which the stay is inserted into the insertion port of the support.

As shown in FIG. 12, when the upper end portion of the operation cable 40 thus constructed is inserted into the cylindrical the support 2S from below, the operation cable 40 is temporarily retained while the upper end portion thereof is suspended from the support 2S. In this suspended condition, as shown in FIG. 13, upon insertion of the stay 4B into the cylindrical support 2S from above, the operation cable 40 can be transferred from a condition in which the operation cable 40 is suspended from the support 2S to a condition in which the operation cable 40 is suspended from the stay 4B.

Further, when the operation cable 40 is in the condition in which it is suspended from the stay 4B, the operation cable 40 is in a condition in which the operation cable 40 can transmit the operational force produced from the lower end thereof being pulled to the push rod 50 positioned inside the stay 4B as a pushing operational force.

The construction described above is described in detail with reference to FIG. 3. First, formed in a circumferential wall of the support 2S are slot-shaped insertion grooves Sd and Sd that extend axially upwardly from a lower end portion of the support 2S. The insertion grooves Sd and Sd are positioned in two circumferential positions of the support 2S so as to be axisymmetrical with each other. The insertion grooves Sd and Sd are respectively shaped such that the engagement projections 41P and 41P formed in the inner member 41 of the operation cable 40 can be received therein and can be inserted thereinto in an axial direction.

The insertion grooves Sd and Sd are respectively shaped such that terminal end portions corresponding to upper end sides thereof that receive the engagement projections 41P and 41P are respectively circumferentially curved leftwardly and rightwardly as seen in the drawings. In particular, the insertion groove Sd positioned in a near side in FIG. 3 and shown by solid lines is shaped such that the terminal end portion thereof is curved leftwardly as seen in the drawing. Conversely, the insertion groove Sd positioned in a far side in FIG. 3 and shown by broken lines is shaped such that the terminal end portion thereof is curved rightwardly as seen in the drawing. That is, the insertion groove Sd positioned in the far side in FIG. 3 is shaped so as to be axisymmetrical with the insertion groove Sd positioned in the near side in FIG. 3.

Each of the circumferentially curved terminal end portions of the insertion grooves Sd and Sd is shaped so as to be positioned below a horizontal level line. As a result, when the engagement projections 41P and 41P (the operation cable 40) are inserted into the insertion grooves Sd and Sd until they reach terminal end positions thereof, the engagement projections 41P and 41P are stably retained while suspended from the support 2S, so as to be prevented from falling therefrom under their own weight.

The operation cable 40 can be inserted into the cylindrical support 2S by simply inserting the same upwardly (axially) after the engagement projections 41P and 41P attached to the upper end portion of the inner member 41 are inserted into the insertion grooves Sd and Sd. Further, when the engagement projections 41P and 41P reach the axial terminal end positions of the insertion grooves Sd and Sd, the operation cable 40 is circumferentially rotated along to the curved terminal end portions. Thus, as shown in FIG. 12, the engagement projections 41P and 41P reach the circumferentially curved terminal end positions of the insertion grooves Sd and Sd, so that the operation cable 40 can be retained while suspended from the support 2S.

Referring to FIG. 3 again, the upper end portion of the outer member 42 is integrally formed from a synthetic resin, so as to have a bulged portion 42D that is partially bulged radially outwardly. The bulged portion 42D is positioned at an axial mid point of the upper end portion of the outer member 42 that is inserted into the cylindrical support 2S. The bulged portion 42D is formed over the entire circumference thereof and has a serration shape. The bulged portion 42D is formed to have an outer diameter substantially equal to an inner diameter of the support 2S. Therefore, because the bulged portion 42D can be gently fitted into the cylindrical support 2S when the upper end portion of the operation cable 40 is inserted into the cylindrical support 2S, the operation cable 40 can be smoothly inserted without swinging within the cylindrical support 2S.

Further, as shown in FIG. 12, slot-shaped reception grooves Bd and Bd are formed in a circumferential wall of the stay 4B that is inserted into the cylindrical support 2S from above. The reception grooves Bd and Bd are formed so as to extend axially upwardly from an lower end portion of the stay 4B. The reception grooves Bd and Bd are positioned in two circumferential positions of the stay 4B so as to be axisymmetrical with each other. When the stay 4B inserted into the cylindrical support 2S from above, the reception grooves Bd and Bd may receive the engagement projections 41P and 41P of the inner member 41 of the operation cable 40 that is suspended in the cylindrical support 2S. Further, when the stay 4B is further inserted into the support 2S after the engagement projections 41P and 41P are received in the reception grooves Bd and Bd, the engagement projections 41P and 41P are introduced upwardly (axially) along the reception grooves Bd and Bd.

The reception grooves Bd and Bd that receive the engagement projections 41P and 41P are respectively shaped such that terminal end portions corresponding to upper end sides thereof are circumferentially curved in opposite directions opposite to the insertion grooves Sd and Sd described above. Each of the curved terminal end portions of the reception grooves Bd and Bd is shaped so as to be gently curved from an axial direction to a horizontal direction. As a result, when the stay 4B is inserted into the cylindrical support 2S, the engagement projections 41P and 41P positioned in the cylindrical support 2S can be smoothly received in the reception grooves Bd and Bd by a push-in operational force axially applied to the stay 4B until they reach the terminal end positions of the reception grooves Bd and Bd that are directed horizontally.

Therefore, as shown in FIG. 13, when the stay 4B is inserted into the cylindrical support 2S from above, the engagement projections 41P and 41P are circumferentially rotated while guided by the curved portion of the reception grooves Bd and Bd formed in the stay 4B. As a result, the engagement projections 41P and 41P are pushed back from a condition in which the engagement projections 41P and 41P are retained in the terminal end positions of the insertion grooves Sd and Sd and are moved in such a direction as to be released from this condition. When the engagement projections 41P and 41P move along the curved portions of the reception grooves Bd and Bd and reach the terminal end positions thereof, the engagement projections 41P and 41P are pushed back to axially extended portions of the insertion grooves Sd and Sd.

Thus, the engagement projections 41P and 41P are transferred from the condition in which they are suspended from the support 2S such that an axial movement thereof is restrained to the condition in which they are suspended from the stay 4B. As a result, the engagement projections 41P and 41P are placed in a condition in which their axial movement with respect to the stay 4B is restrained. That is, the engagement projections 41P and 41P are released from the axial movement restraint condition in which their axial movement with respect to the support 2S is restrained, so as to be placed in the condition in which their axial movement with respect to the stay 4B is restrained.

At this time, because the engagement projections 41P and 41P are positioned in the axially extended portions of the insertion grooves Sd and Sd, the engagement projections 41P and 41P are placed in a condition in which their circumferential movement with respect to the support 2S is restrained. As a result, the engagement projections 41P and 41P are retained in the terminal end positions of the reception grooves Bd and Bd while guided by the axially extended insertion grooves Sd and Sd. Thus, the inner member 41 of the operation cable 40 and the stay 4B are axially integrally connected to each other, so as to be placed in a condition in which they can axially move together with each other with respect to the support 2S.

Figure 14:
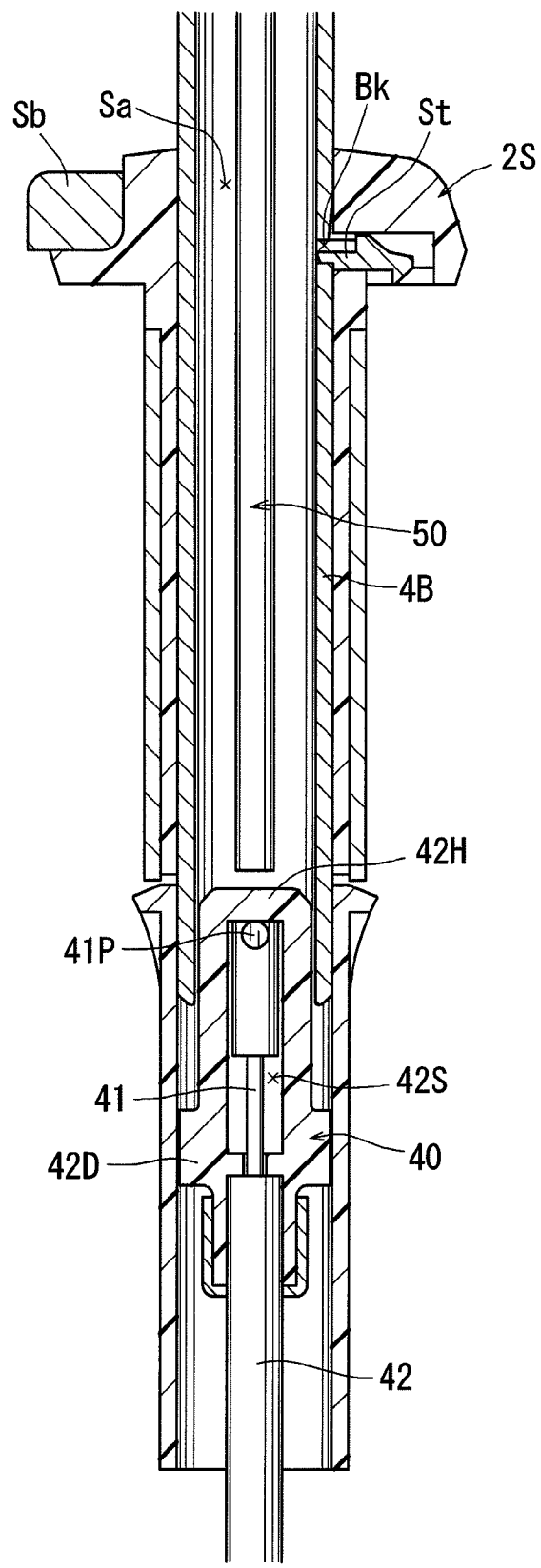
FIG. 14 is a sectional view taken along line XIV-XIV of FIG. 13.

As shown in FIG. 14, disposed in the insertion port Sa of the support 2S is a plate-shaped engagement claw St that is capable of engaging recess-shaped engagement grooves Bk that are formed in the outer circumferential wall of the stay 4B. The engagement claw St is normally applied with a biasing force and is maintained in a postural condition in which the engagement claw St is projected into the insertion port Sa. The engagement claw St can be retracted from the insertion port Sa by pushing a knob Sb from the side.

Thus, when a insertion position of one of the engagement grooves Bk is aligned with the engagement claw St upon insertion of the stay 4B into the insertion port Sa, the engagement claw St enters and engages the corresponding engagement groove Bk by the biasing force. As a result, the stay 4B is placed in a condition in which the stay 4B is restrained from moving in an inserting direction, so as to be locked The condition in which the stay 4B is restrained from moving in the inserting direction can be canceled by disengaging the engagement claw St from the engagement groove Bk by pushing the knob Sb. The engagement grooves Bk are formed in a plurality of positions in the axial direction of the stay 4B. Therefore, height of the headrest 4 can be freely adjusted by appropriately performing pushing operation of the knob Sb.

As described above, upon insertion of the stay 4B, the lower end portion of the stay 4B and the upper end portion of the inner member 41 are axially connected to each other, thereby providing a condition in which the head portion 42H of the outer member 42 of the operation cable 40 is inserted into the cylindrical stay 4B from below. As a result, the head portion 42H of the outer member 42 is axially positioned closer to the lower end portion of the push rod 50 that is inserted in the cylindrical stay 4B.

Strictly speaking, a small gap is formed between the lower end portion of the push rod 50 and the head portion 42H such that the push rod 50 cannot be erroneously pushed by the head portion 42H of the outer member 42 when the stay 4B is inserted.

Further, in a condition in which the head portion 42H of the outer member 42 and the lower end portion of the push rod 50 are axially positioned closer to each other, the head portion 42H and the push rod 50 is in an axial connection condition in which the operational force produced from the lower end of the operation cable 40 being pulled can be reversed by the head portion 42H of the outer member 42 and be transmitted to the push rod 50 as the pushing operational force.

Further, the above-described headrest 4 can be detached from the seat back 2 by pulling the stays 4B and 4B from the cylindrical the supports 2S and 2S. At this time, as the stays 4B and 4B are drawn out, an axial connection condition between a connection end portion of the inner member 41 and the lower end portion of the stay 4B is canceled.

In particular, as will be recognized from FIG. 13, as the stay 4B is upwardly pulled from the support 2S, the engagement projections 41P and 41P are circumferentially rotated while guided by the curved portion of the insertion grooves Sd and Sd of the support 2S. As a result, the engagement projections 41P and 41P are pushed back from a condition in which the engagement projections 41P and 41P are retained in the terminal end positions of the reception grooves Bd and Bd and are moved in such a direction as to be removed from this condition. When the engagement projections 41P and 41P move along the curved portions of the insertion grooves Sd and Sd and reach the terminal end positions thereof, the engagement projections 41P and 41P are pushed back to axially extended portions of the reception grooves Bd and Bd. As a result, as shown in FIG. 12, the engagement projections 41P and 41P are transferred again from the condition in which they are suspended from the stay 4B to the condition in which they are suspended from the support 2S. Thus, the axial connection condition of the head portion 42H of the outer member 42 of the operation cable 40 and the push rod 50 in which they are positioned closer to each other can be canceled.

Next, the headrest moving mechanism 10 is described. While construction of the headrest moving mechanism 10 is shown in FIGS. 5 to 11, the construction is best shown in FIG. 8. Therefore, the construction is described with reference to this drawing.

The headrest moving mechanism 10 is arranged such that the support portion 4A is connected to the headrest base portion 4C. The headrest moving mechanism includes a pair of connection links 12 and 12 that are laterally positioned, support members 13 and 13, hooks 14 and 14, an engagement-disengagement member 15, the tension spring 16 and lever members 17 and 17.

The headrest base portion 4C is made of a synthetic resin. The headrest base portion 4C has a plate-shaped rear surface portion 11B, a bottom surface portion 11D, side surface portions 11S and 11S and a top surface portion 11U that are integrally formed. In particular, the bottom surface portion 11D extends forwardly from a lower end edge of the rear surface portion 11B. Further, the side surface portions 11S and 11S are vertically positioned on widthwise both sides of the headrest base portion 4C. Further, the top surface portion 11U connects upper edges of the side surface portions 11S and 11S.

Figure 11:
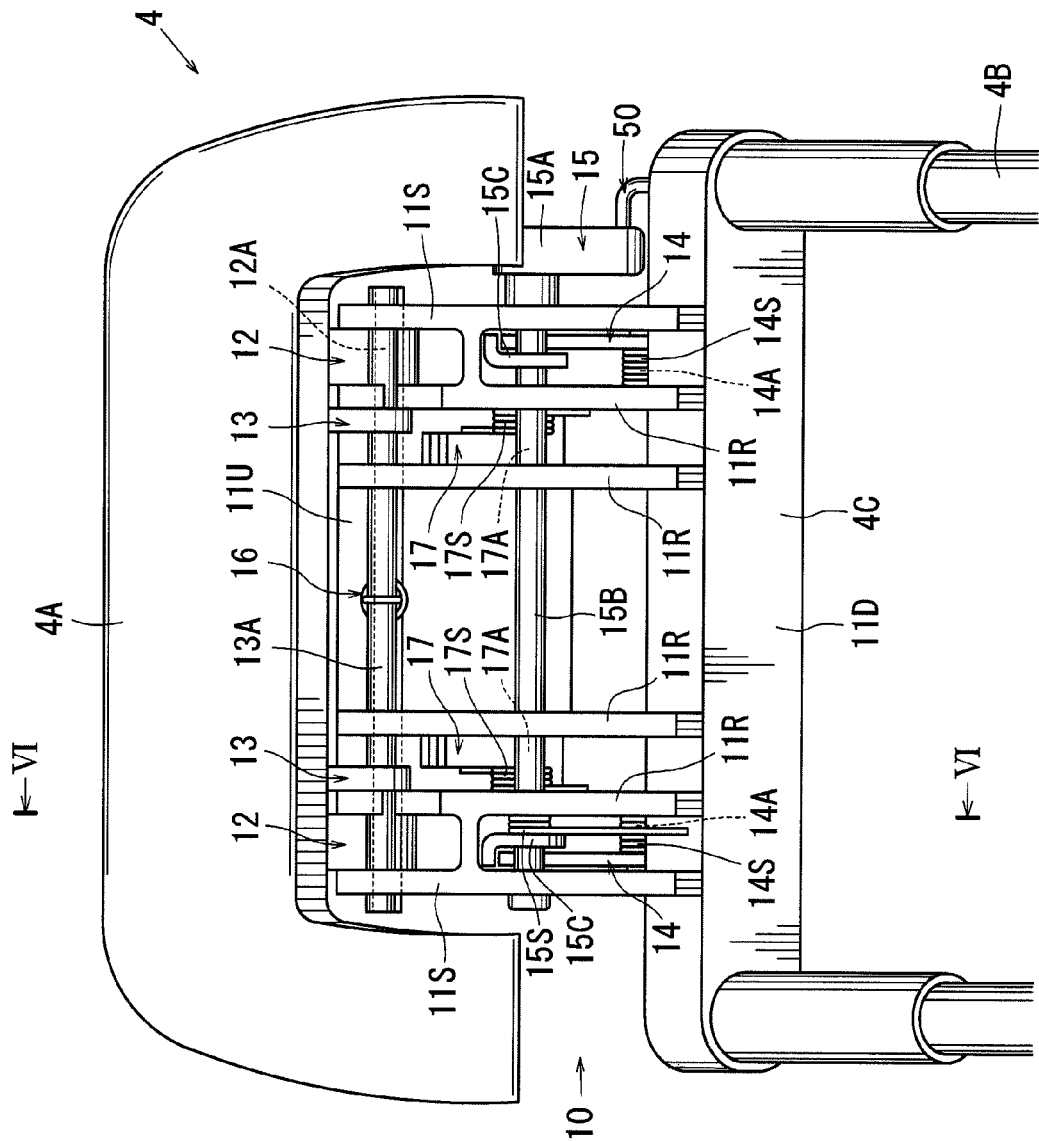
FIG. 11 is a structural diagram of the headrest moving mechanism, which is viewed from line XI of FIG. 8.

FIG. 11 is a view that is viewed from line XI of FIG. 8, that is, a front view of the headrest 4 that is viewed from obliquely below. As shown in the drawing, a plurality of upright plate-shaped ribs 11R-- (A symbol "--" means a plural number.) are formed between the side surface portions 11S and 11S of the headrest base portion 4C, so as to reinforce the headrest base portion 4C. The ribs 11R-- are vertically positioned in parallel.

Upper end portions of the stays 4B and 4B are respectively inserted into the bottom surface portion 11D of the headrest base portion 4C, and are integrally fixed thereto. Further, the stays 4B and 4B have tubular shapes and are secured to the bottom surface portion 11D such that opened upper end portions thereof are exposed to an upper surface side of the bottom surface portion 11D.

Further, wave-shaped elongated holes 11H are formed in the side surface portions 11S and 11S of the headrest base portion 4C. The elongated holes 11H and 11H are formed by cutting out the side surface portions 11S and 11S in a thickness direction thereof. The elongated holes 11H and 11H have first stopper grooves H1 and second stopper grooves H2 that are formed between lower end portions H0 and H0 and upper end portions H3 and H3. The first stopper grooves H1 and the second stopper grooves H2 are depressed rearwardly (rightwardly in the drawings) in a wave-like and step-like fashion.

Next, referring to FIG. 8 again, a pair of connection links 12 and 12 are made of a synthetic resin. The connection links 12 and 12 may function as connection members that link the headrest base portion 4C and the support portion 4A to each other. The connection links 12 and 12 are positioned on the support portion 4A so as to be laterally spaced from each other, and their end portions are respectively connected to an upper end portion of the headrest base portion 4C and a rear surface of the support portion 4A.

In particular, the rear end portions of the connection links 12 and 12 are rotatably supported by a connection shaft 12A that passes through the side surface portions 11S and 11S of the headrest base portion 4C. Further, as shown in FIG. 11, the rear end portions of the connection links 12 and 12 are positioned between the side surface portions 11S and 11S and the ribs 11R and 11R positioned inside thereof. Thus, the connection links 12 and 12 are rotatably supported by the connection shaft 12A that extends between the side surface portions 11S and 11S.

Referring to FIG. 8 again, the front end portions of the connection links 12 and 12 are rotatably supported by a connection shaft 12B that is laterally positioned on the rear surface of the support portion 4A. The connection shafts 12A and 12B are positioned so as to be parallel to each other.

The above-described connection links 12 and 12 are arranged, when rotated clockwise about the connection shaft 12A that rotatably supports the rear end portions thereof, to contact the top surface portion 11U of the headrest base portion 4C, so that their clockwise rotation can be restrained.

Next, a pair of support members 13 and 13 are integrally connected to the support portion 4A so as to extend rearwardly from the rear surface of the support portion 4A. The support members 13 and 13 are positioned on the support portion 4A so as to be laterally spaced from each other. The support portion 4A is made of a synthetic resin. Further, the support portion 4A is integrally formed such that a front surface thereof has a curved plate-shape. Further, the rear surface of the support portion 4A is integrally formed with support portions for rotatably supporting the connection shaft 12B. Also, the rear surface of the support portion 4A is integrally formed with the support members 13 and 13.

Rear end portions of the support members 13 and 13 are connected to each other by a connection shaft 13A that extends in a width direction. In particular, as shown in FIG. 11, the rear end portions of the support members 13 and 13 are positioned between the ribs 11R and 11R positioned outside thereof and the ribs 11R, 11R positioned inside thereof. Further, the connection shaft 13A that connects the rear end portions of the support members 13 and 13 is positioned so as to be parallel to the connection shaft 12A and the connection shaft 12B described above.

End portions of the connection shaft 13A are passed through the elongated holes 11H and 11H that are formed in the side surface portions 11S and 11S of the headrest portion 4C. Therefore, the connection shaft 13A is capable of moving back and forth and up and down only within a range defined by the profiles of elongated holes 11H and 11H. Further, the ribs 11R-- (FIG. 11) that are formed between the side surface portions 11S and 11S are shaped so as to not interfere with the connection shaft 13A that moves within the elongated holes 11H and 11H.

Figure 6:
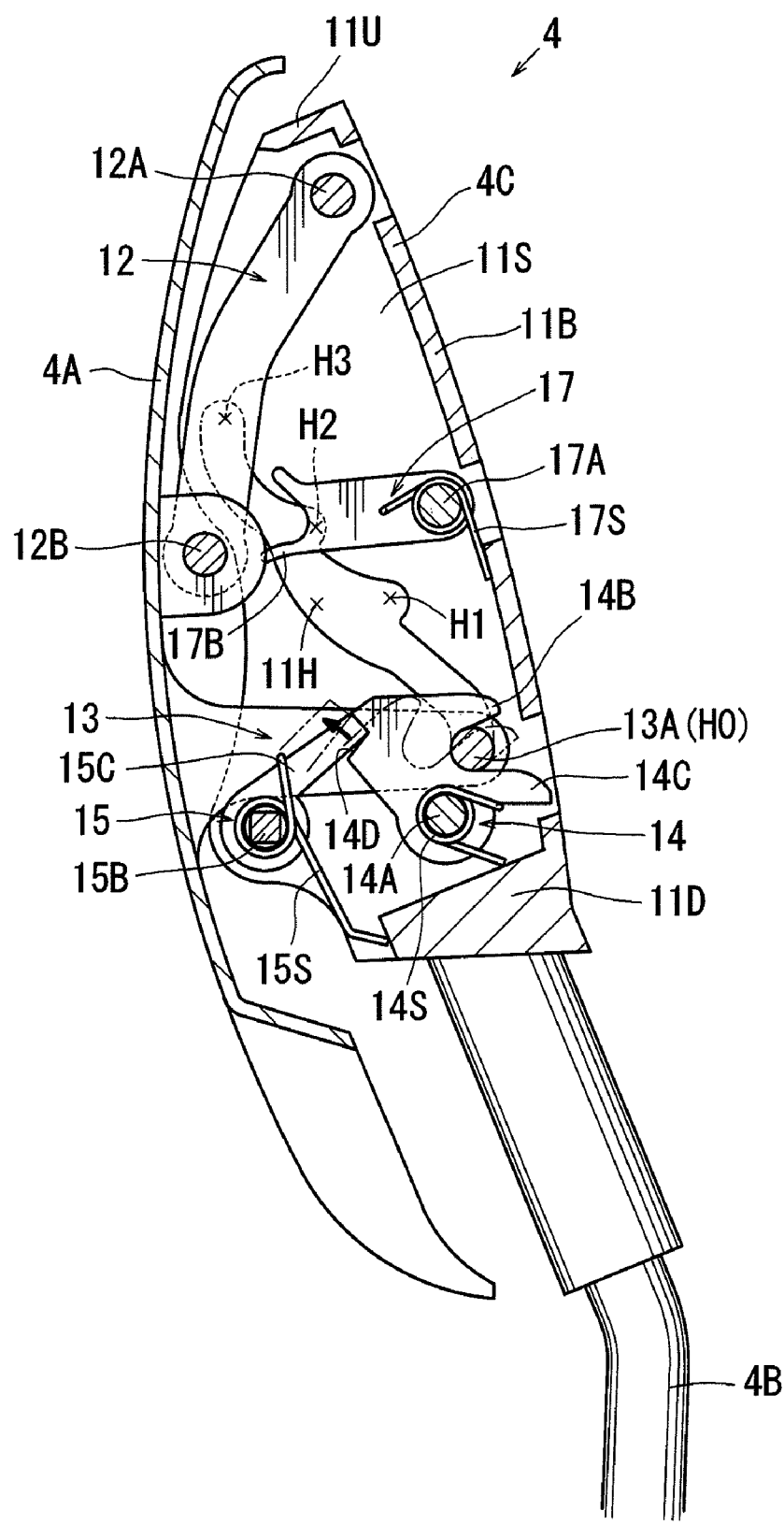
FIG. 6 is a schematic view of internal structure of a headrest moving mechanism, which corresponds to a sectional view taken along line VI-VI of FIG. 11.

Next, as shown in FIG. 6, a pair of hooks 14 and 14 are formed to cam shapes as a whole and are disposed in the headrest base portion 4C. The hooks 14 and 14 are positioned at a lower end portion of the headrest base portion 4C so as to be laterally spaced from each other. The hooks 14 and 14 are provided as restraint members that are capable of restraining movement of the connection shaft 13A moving within the elongated holes 11H and 11H at an initial position thereof.

In particular, as shown in FIG. 11, the hooks 14 and 14 are positioned between the side surface portions 11S and 11S and the ribs 11R and 11R positioned inside thereof and are respectively rotatably supported by connection shafts 14A and 14A that extend therebetween.

Referring to FIG. 6 again, formed in each of the hooks 14 and 14 is a claw-shaped upper jaw portion 14B and a claw-shaped lower jaw portion 14C that extend radially outwardly thereof. Each of the upper jaw portion 14B and the lower jaw portion 14C is positioned in two positions on outer circumferential portions of the hook 14. As a result, formed between the upper jaw portions 14B and 14B and the lower jaw portions 14C and 14C are recesses that are depressed radially inwardly. The recesses formed between the upper jaw portions 14B and the lower jaw portions 14C are shaped such that the above-mentioned connection shaft 13A can be receive therein. The connection shafts 14A and 14A are positioned so as to be parallel to the connection shafts 12A and 12B and the connection shaft 13A.

Further, torsion springs 14S and 14S are disposed between the hooks 14 and 14 and the headrest base portion 4C described above. The torsion springs 14S and 14S are disposed while they are previously twisted. The hooks 14 and 14 are biased by the torsion springs 14S and 14S so as to be rotated counterclockwise from a position shown in FIG. 6.

Further, step-shaped engagement grooves 14D are formed in the outer circumferential portions of the hooks 14 and 14. The engagement grooves 14D and 14D engage a pair of engagement arm portions 15C and 15C that are formed in the engagement-disengagement member 15 which will be described hereinafter. Thus, the hooks 14 and 14 can be maintained in a condition in which counterclockwise rotation thereof by biasing forces is restrained.

Therefore, in the condition in which the counterclockwise rotation of the hooks 14 and 14 is restrained, the hooks 14 and 14 can maintain the connection shaft 13A in a condition in which the connection shaft 13A is retained in the lower end portions H0 and H0 of the elongated holes 11H and 11H while the connection shaft 13A is received in the recesses formed between the upper jaw portions 14B and 14B and the lower jaw portions 14C and 14C.

As shown in FIG. 5, the connection shaft 13A is normally biased toward the connection shaft 12A by the tension spring 16 that is disposed between the connection shaft 13A and the connection shaft 12A, so as to be biased toward the upper end portions H3 and H3 along the profiles of the elongated holes 11H and 11H. Thus, the connection shaft 13A is normally maintained in the condition (an initial condition) in which the connection shaft 13A is retained in the lower end portions H0 and H0 of the elongated holes 11H and 11H by the hooks 14 and 14 against the biasing force of the tension spring 16.

Figure 7:
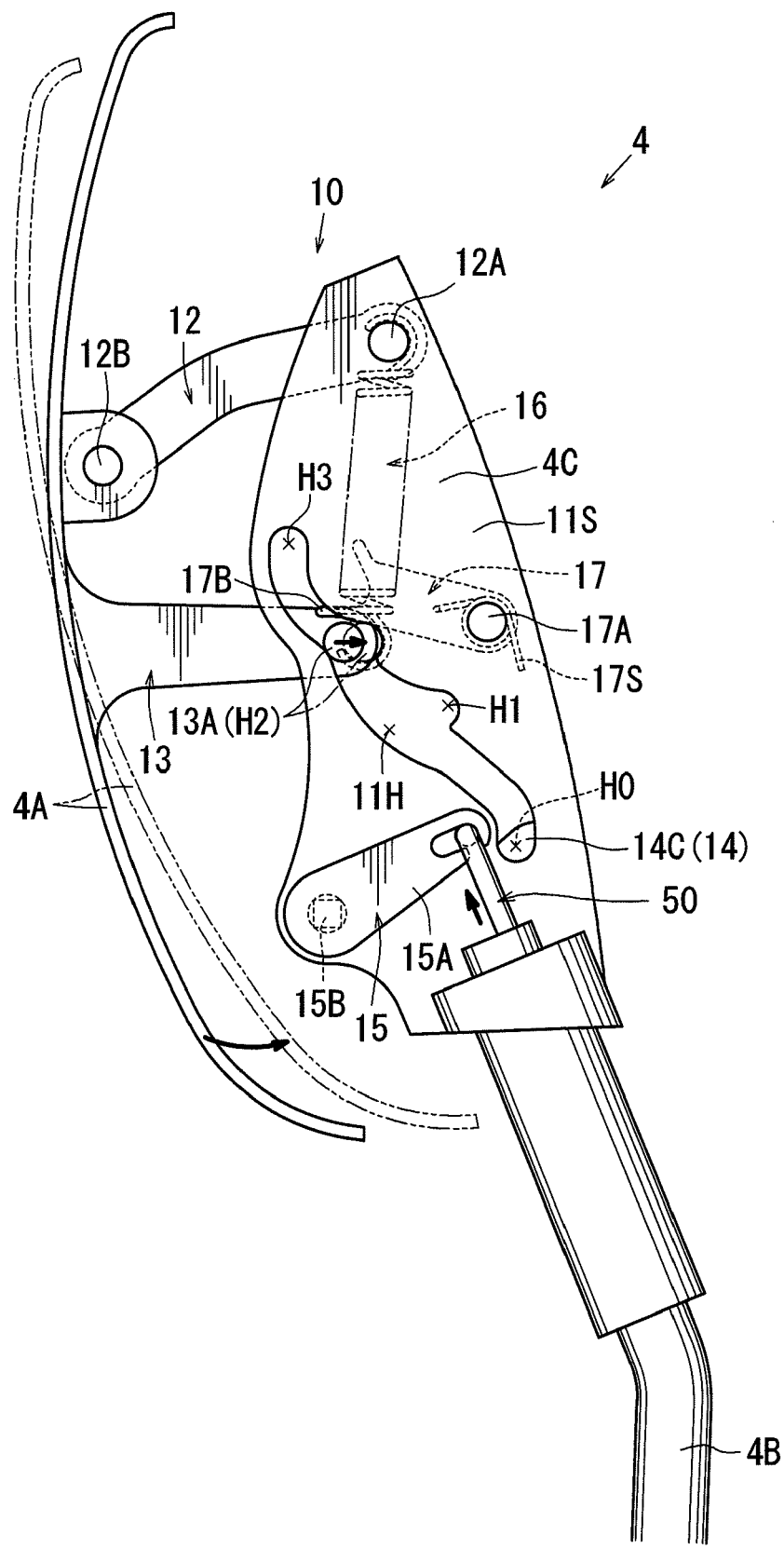
FIG. 7 is a side view, which illustrates a condition in which the support portion of the headrest is moving toward a head.

Further, referring to FIG. 6 again, when the engagement arm portions 15C and 15C are disengaged from the hooks 14 and 14 upon counterclockwise rotation thereof, the hooks 14 and 14 can rotate counterclockwise by biasing forces of the torsion springs 14S and 14S. As a result, as indicated by broken lines in FIG. 6, the upper jaw portions 14B and 14B of the hooks 14 and 14 are moved out of the elongate holes 11H and 11H, and the lower jaw portions 14C and 14C are pushed up from below, so as to be exposed to the elongated holes 11H and 11H. Thus, the condition in which the connection shaft 13A is retained by the hooks 14 and 14 is canceled. As a result, as shown in FIGS. 7 and 8, the connection shaft 13A moves forwardly and upwardly along the profiles of the elongated holes 11H and 11H by the biasing force of the tension spring 16. As a result, the support portion 4A relatively moves forwardly and upwardly with respect to the headrest base portion 4C while rotating the connection links 12 and 12.

Referring to FIG. 6 again, the engagement arm portions 15C and 15C that can restrain the counterclockwise rotation of the hooks 14 and 14 are positioned so as to be laterally spaced from each other, and are positioned so as to be capable of engaging the hooks 14 and 14. In particular, as shown in FIG. 11, similar to the hooks 14 and 14, the engagement arm portions 15C and 15C are positioned between the side surface portions 11S and 11S and the ribs 11R and 11R positioned inside thereof. Further, the engagement arm portions 15C and 15C are rotatably supported by a connection shaft 15B that extends between the side surface portions 11S and 11S. The connection shaft 15B is integrally connected to the engagement arm portions 15C and 15C and is rotatably supported by the side surface portions 11S and 11S. The connection shaft 15B is positioned so as to be parallel to the connection shafts 12A and 12B and the connection shaft 13A.

Further, a torsion spring 15S is dispose between one of the engagement arm portions 15C and the headrest base portion 4C. The torsion spring 15S is disposed while it is previously twisted. As shown in FIG. 6, the torsion spring 15S biases the engagement arm portions 15C and 15C clockwise. Thus, the engagement arm portions 15C and 15C are normally maintained in a condition in which they are pressed to the outer circumferential portions of the hooks 14 and 14 while distal ends of the engagement arm portions 15C and 15C respectively engage the step-shaped engagement grooves 14D and 14D. When the engagement arm portions 15C and 15C engage the engagement grooves 14D and 14D, the engagement arm portions 15C and 15C and the engagement grooves 14D and 14D are oppositely contact each other, so that biased rotation thereof are mutually restrained.

Further, referring to FIG. 5 again, an operation arm portion 15A is integrally connected to an end portion of the connection shaft 15B that is connected to the engagement arm portions 15C and 15C described above. The operation arm portion 15A is arranged so as to be rotated by the push rod 50 described above. When the vehicle back-side collision happens and the push rod 50 is pushed upwardly, the operation arm portion 15A is rotated counterclockwise. As a result, as shown in FIG. 6, the operation arm portion 15A rotates the engagement arm portions 15C and 15C in the same direction, thereby disengaging the engagement arm portions 15C and 15C from the hooks 14 and 14. Thus, a condition in which the support portion 4A is retained in the initial position can be canceled, so that the support portion 4A is transferred forwardly and upwardly by the biasing force of the tension spring 16.

As shown in FIG. 8, forward and upward movement of the support portion 4A is restrained and stopped when the connection shaft 13A reaches the upper end portions H3 and H3 of the elongated holes 11H and 11H. Further, in a condition in which the movement of the support portion 4A is stopped, the support portion 4A cannot be pushed back rearwardly even if the support portion 4A is applied with a loading from the head of the sitting person.

That is, when the connection shaft 13A reaches the upper end portions H3 and H3 of the elongated holes 11H and 11H, the connection links 12 and 12 connected to the supported portion 4A contact the top surface portion 11U of the headrest base portion 4C, so as to become a condition in which clockwise rotation thereof is restrained. In the condition in which the clockwise rotation of the connection links 12 and 12 is restrained, when the support portion 4A is applied with a force that urges the same to move rearwardly, the connection links 12 and 12 are applied with a force that urges the same to press against the top surface portion 11U of the headrest base portion 4C. Therefore, even if the support portion 4A is applied with a pressing force as described above, the support portion 4A is prevented from being rotated counterclockwise. As a result, the support portion 4A can catch the head of the sitting person in the collision preparatory position.

Further, as shown in FIG. 7, the support portion 4A can be prevented from being pushed back rearwardly if it is pressed by the head of the sitting person while it is moving forwardly. That is, when the connection shaft 13A is applied with a force that urges the same to move rearwardly while the support portion 4A is moving forwardly, the connection shaft 13A can enter the first stopper grooves H1 and H1 or the second stopper grooves H2 and H2 that are formed in the elongated holes 11A and 11A so as to be depressed rearwardly (rightwardly in the drawings) in the step-like fashion. As a result, rearward movement of the connection shaft 13A is restrained, so that the support portion 4A can be maintained in a position on the way in a forward movement thereof. Therefore, even when the support portion 4A does not yet reach the collision preparatory position, the head of the sitting person can be caught by the support portion 4A. Further, FIG. 7 shows a condition in which the connection shaft 13A is placed in the second stopper grooves H2 and H2.

Referring to FIG. 5 again, attached to the headrest base portion 4C are a pair of lever members 17 and 17 that are formed by arm-shaped members. The lever members 17 and 17 are positioned so as to be laterally spaced from each other, and their rear end portions are respectively rotatably connected to the headrest base portion 4C.

In particular, as shown in FIG. 11, the rear end portions of the lever members 17 and 17 are positioned between the outer ribs 11R and 11R and the inner ribs 11R and 11R and are respectively rotatably supported by connection shafts 17A and 17A that extend therebetween.

Further, torsion springs 17S and 17S are disposed between the lever members 17 and 17 and the headrest base portion 4C. As shown in FIG. 5, the torsion springs 17S and 17S are wound around the connection shafts 17A and 17A. One end of each of the torsion springs 17S and 17S is connected to each of the lever members 17 and 17. The other end of each of the torsion springs 17S and 17S is connected to the headrest base portion 4C. Thus, in their free conditions, the lever members 17 and 17 are maintained in a postural condition in which they are exposed to the elongated holes 11H and 11H by spring forces of the torsion springs 17S and 17S.

Spoon-shaped receiving portions 17B are respectively formed in left or forward end portions of the lever members 17 and 17 that are exposed to the elongated holes 11H and 11H. As shown in FIG. 7, when the connection shaft 13A moves upwardly from the lower ends H0 and H0 within the elongated holes 11H and 11H, the receiving portions 17B and 17B are pushed away by the connection shaft 13A, so as to be pushed out of the elongated holes 11H and 11H. However, as shown in FIG. 8, when the connection shaft 13A reaches the upper end portions H3 and H3 of the elongated holes 11H and 11H, the receiving portions 17B and 17B are returned to the postural condition in which they are exposed to the elongated holes 11H and 11H by the spring forces of the torsion springs 17S and 17S.

Figure 9:
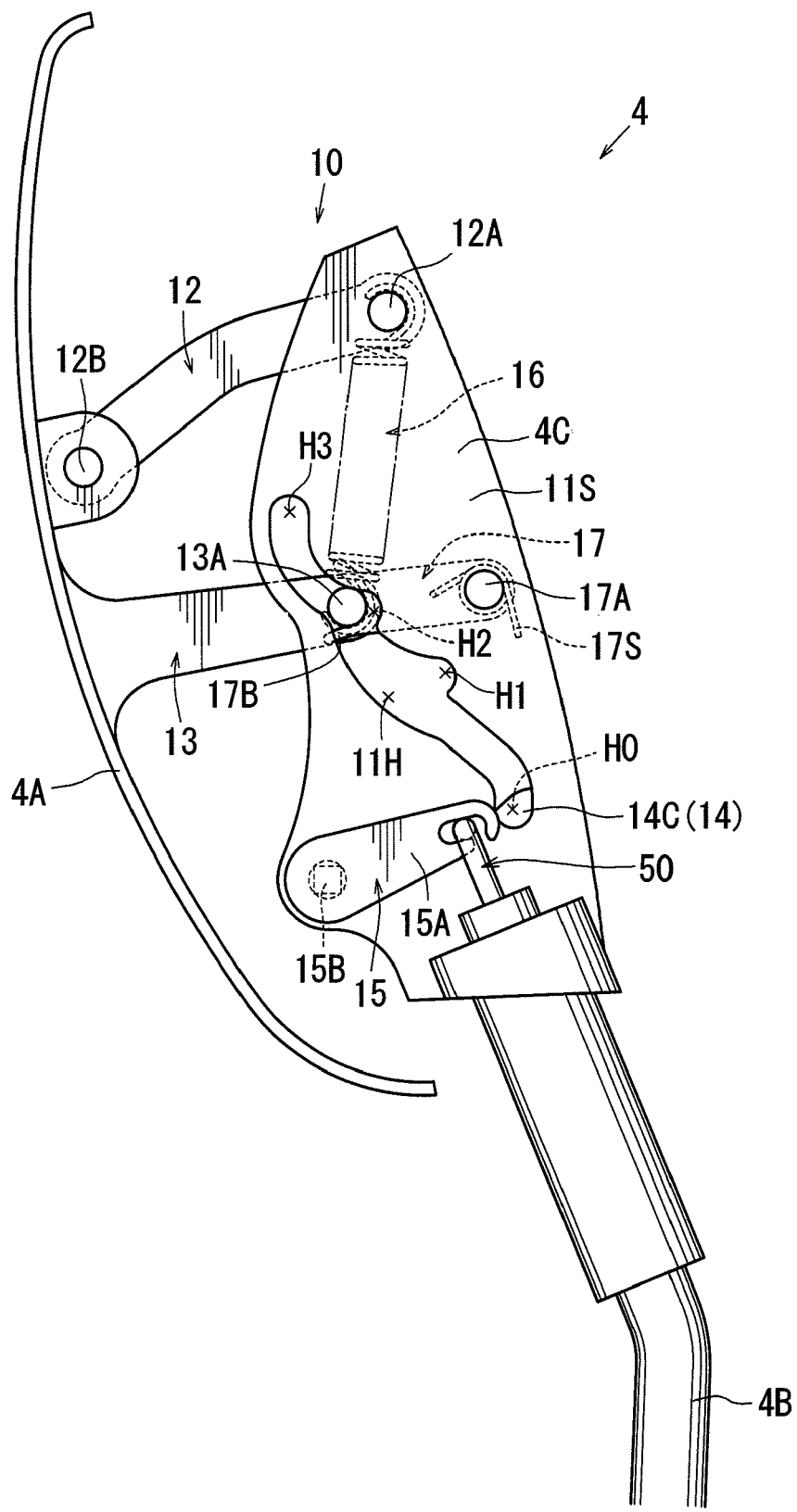
FIG. 9 is a side view, which illustrates a condition in which the support portion of the headrest is moving from the position closer to the head toward the initial position.

Further, as shown in FIG. 9, when the connection shaft 13A is transferred within the elongated holes 11H and 11H downwardly from the upper end portions H3 and H3, the receiving portions 17B and 17B catch the connection shaft 13A by their spoon-shaped distal ends. Further, when, in this condition, the connection shaft 13A is further transferred downwardly, the lever members 17 and 17 are pushed and rotated counterclockwise in the drawing while pressed by the connection shaft 13A that is caught by the receiving portions 17B and 17B.

Figure 10:
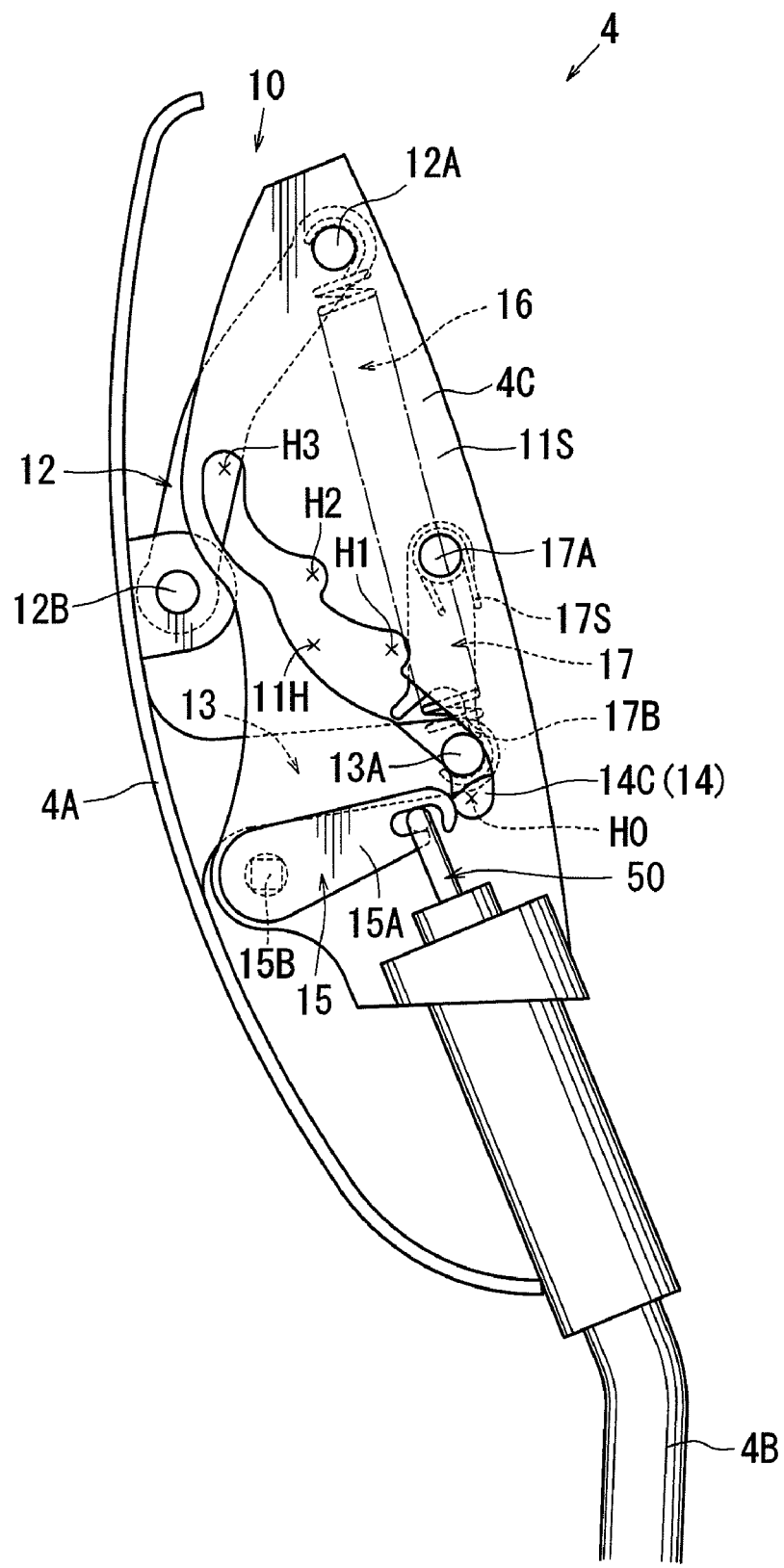
FIG. 10 is a side view, which illustrates a condition in which the support portion of the headrest is moved toward the initial position while it is guided.

As shown in FIG. 10, the connection shaft 13A, when transferred to a portion closer to the lower end portions H0 and H0 while guided by the lever members 17 and 17, is disengaged from the receiving portions 17B and 17B. Thus, the connection shaft 13A, when transferred downwardly from the upper end portions H3 and H3 within the elongated holes 11H and 11H, is smoothly transferred to the lower end portions H0 and H0 while guided by the lever members 17 and 17, so as to not enter the first stopper grooves H1 and H1 or the second stopper grooves H2 and H2.

Further, because the connection shaft 13A is operated so as to be pressed toward the lower end portions H0 and H0 of the elongated holes 11H and 11H, the connection shaft 13A reaches the lower end portions H0 and H0 while pressing down the lower jaw portions 14C and 14C of the hooks 14 and 14 that are exposed to the lower end portions H0 and H0. As a result, as shown in FIG. 6, the hooks 14 and 14 are rotated clockwise in the drawing, so as to be placed in a postural condition in which the upper jaw portions 14B and 14B thereof are positioned over the upper side of the connection shaft 13A.

The hooks 14 and 14, when placed in the condition as described above, engage the engagement arm portions 15C and 15C, so as to be is locked again in a condition in which the connection shaft 13A is maintained in the initial position. As a result, the support portion 4A is maintained again in a condition in which it is returned to the posture of the initial position thereof, i.e., a position before it is moved forwardly.

Next, a method of using the embodiment is described.

Referring to FIG. 1, in the normal condition in which the vehicle back-side collision does not yet happen, the vehicle seat 1 is in a condition in which the support portion 4A of the headrest 4 is maintained in the posture of the initial position thereof. When the vehicle back-side collision happens, the pressure receiving portion 21 is pressed rearwardly by the seat back loading applied by the sitting person. As a result, a corresponding operational force is transferred via the operation cable 40 and the push rod 50, so that the engagement-disengagement member 15 is rotated.

Thus, the support portion 4A is released from a condition in which it is retained in the initial position. As a result, as shown in FIG. 8, the support portion 4A moves to the collision preparatory position by the biasing force of the tension spring 16. Further, the support portion 4A that is moved to the collision preparatory position can receive the head of the sitting person that is inclined rearwardly by the impact of the collision from a back-side of the head.

Thus, according to the cable connection structure of the embodiment, the inner member 41 of the operation cable 40 that corresponds to the pull-type first cable and the stay 50 that corresponds to the outer member of the push-type second cable are axially connected to each other. Therefore, the inner member 41 of the operation cable 40 can transmit the force produced from the lower end thereof being pulled to the lower end portion of the push rod 50 inserted into the tubular stay 50 as the pushing operational force via the head portion 42H of the outer member 42. This means that double layer structured cables having different structures in push and pull types can be axially connected to each other such that a force can be transmitted therebetween.

Further, a connection end portion of the inner member 41 of the operation cable 40 is provided with the engagement projections 41P and 41P. Conversely, respectively formed in the circumferential walls of the support 2S and the stay 50 are the insertion grooves Sd and Sd and the reception grooves Bd and Bd. These grooves Sd and Sd and Bd and Bd are respectively engageable with the engagement projections 41P and 41P and are respectively circumferentially oppositely bent. Therefore, it is possible to easily provide a construction in which the two cables are axially connected each other by axially overlapping connection end portions thereof. Further, due to the shapes of the insertion grooves Sd and Sd and the reception grooves Bd and Bd, it is possible to provide a construction in which the two cables are separated from each other by moving the connection end portions thereof relative to each other in such a direction as to be pulled from each other.

Further, the circumferentially bent portions of the insertion grooves Sd and Sd and the reception grooves Bd and Bd that movably receive the engagement projections 41P and 41P are shaped so as to be circumferentially curved. Therefore, the two cables can be smoothly axially moved.

Further, the engagement projections 41P and 41P and the elongated holes 42S and 42S and the reception grooves Bd and Bd that are engageable with the engagement projections 41P and 41P are axisymmetrically formed in a plurality of (two) circumferential positions. Therefore, the two cables can be smoothly moved axially without producing any deflection.

Further, the mutually-separable cable connection structure is applied to an insertion connection portion of the stay 50 of the headrest 4 and the support 2S of the seat back 2. Therefore, the cables can be easily axially connected to each other and separated from each other by inserting the stay 50 into the support 2S or pulling the stay 50 from the support 2S.

An embodiment of the present invention is described hereinbefore. However, the present invention can be carried out in various forms.

For example, the headrest moving mechanism can be constructed using a four-joints link mechanism as disclosed in Japanese Laid-Open Patent Publication No. 2005-104259. Further, the headrest moving mechanism can be constructed such that when the cables are moved by a desired distance, the headrest can directly move in an advancing direction by a distance corresponding to the moving distance of the cables.

Further, the outer member of the second cable is constructed of the stay. However, the outer member of the second cable can be constructed of a tubular member that is additionally provided.

Further, the cable connection structure that is applied to the insertion connection portion of the headrest and the seat back of the vehicle seat is exemplified. However, such a connection structure can be applied to various portions in which the double layer structured cables should be connected to each other.

Further, the insertion grooves formed in the support and the reception grooves formed in the stay can respectively be shaped such that the terminal end portions thereof are circumferentially linearly turned. Further, the terminal end portions of the insertion grooves can be circumferentially horizontally turned and not directed downwardly. In this case, the engagement projections can be easily disengaged from the terminal end portions of the insertion grooves. However, the engagement projections can be easily moved to the terminal end portions of the insertion grooves when the operation cable is axially inserted. Further, the insertion grooves are formed as through grooves that are formed in the circumferential wall of the support. However, the insertion grooves can be formed as bottomed grooves that are formed in an inner surface of the circumferential wall of the support.

Further, the engagement projections formed in the inner member of the operation cable and the grooves engaged with the engagement projections can be a single engagement projection a single groove. Conversely, the engagement projections and the grooves can be three or more engagement projections and three or more grooves.

What is claimed is:

1. A cable connection structure, for axially connecting a first cable and a second cable to each other,
   wherein the first cable has a double layer structure in which an inner member capable of moving by a pulling operation is axially inserted into a tubular outer member, and has a pull-type cable structure in which the inner member can be operated in such a direction as to be pulled from the outer member at an opposite end portion opposite to a connection end portion that is connected to the second cable,
   wherein the second cable has a double layer structure in which an inner member capable of moving by a pushing operation is axially inserted into a tubular outer member, and has a push-type cable structure in which the inner member can be operated in such a direction as to be axially pushed into the outer member at a side of a connection end portion that is connected to the first cable, wherein an axial connection of the first cable and the second cable is performed by a connection structure that includes an axial connection condition in which the inner member of the first cable and the outer member of the second cable are integrally connected to each other so as to be prevented from axially moving relative to each other and a condition in which connection end portions of the outer member of the first cable and the inner member of the second cable contact each other, wherein in the axial connection condition in which the inner member of the first cable and the outer member of the second cable are connected, when the inner member of the first cable is pulled from a side of the opposite end portion thereof, the outer member of the first cable is axially relatively pushed out at a side of the connection end portion of the first cable, so that the connection end portion of the inner member of the second cable is axially pushed by a head portion of the outer member of the first cable that is pushed out, wherein the axial connection of the first cable and the second cable is performed via a cylindrical connection member that is axially connected to a stationary member, wherein the connection end portions of the first cable and the second cable are shaped so as to be inserted into the cylindrical connection member, wherein the connection end portion of the inner member of the first cable is provided with a radially outwardly projected engagement projection that constitutes the connection structure, and the tubular outer member of the first cable is provided with a cutout that allows the engagement projection to project radially outwardly therethrough and to relatively move axially therealong, wherein a circumferential wall of the connection end portion of the tubular outer member of the second cable is formed with an axially extended reception groove that constitutes the connection structure, the reception groove being capable of axially receiving the engagement projection provided to the connection end portion of the inner member of the first cable, wherein the first cable is constructed such that when the connection end portion of the first cable is inserted axially into the cylindrical connection member from one side, the engagement projection provided to the connection end portion of the inner member thereof can be axially moved along an insertion groove that is formed in the connection member, wherein the insertion groove formed in the connection member is shaped such that an axial terminal end portion of the insertion groove into which the engagement projection is inserted is bent in a circumferential direction, wherein the reception groove formed in the connection end portion of the outer member of the second cable is shaped such that an axial terminal end portion of the reception groove into which the engagement projection is inserted is bent in an opposite circumferential direction opposite to the terminal end portion of the insertion groove, wherein when the connection end portion of the first cable is axially inserted into the cylindrical connection member from one side thereof and the engagement projection provided to the connection end portion of the inner member of the first cable reaches the circumferentially bent terminal end portion of the insertion groove that is formed in the connection member, the engagement projection is maintained in a condition in which axial movement of the first cable with respect to the connection member is restrained, wherein when the connection end portion of the second cable is axially inserted into the cylindrical connection member retaining the connection end portion of the first cable from the other side thereof, the engagement projection retained in the terminal end portion of the insertion groove of the connection member is axially received by the reception groove formed in the connection end portion of the outer member of the second cable, and wherein when the second cable is further inserted into the cylindrical connection member, the engagement projection is pushed in the opposite circumferential direction from the terminal end portion of the insertion groove while guided by the circumferentially oppositely bent terminal end portion of the reception groove that is formed in the outer member of the second cable so as to reach the terminal end portion of the reception groove such that the engagement projection is released from a condition in which axial movement thereof with respect to the connection member is restrained and is placed in a condition in which axial movement thereof with respect to the outer member of the second cable is restrained, thereby providing the axial connection condition in which the inner member of the first cable and the outer member of the second cable can be integrally connected so as to axially move while integrated with each other.

2. The cable connection structure as defined in claim 1, wherein the connection structure axially connecting the inner member of the first cable and the outer member of the second cable is constructed such that when the connection end portion of the second cable is moved in such a direction as to be pulled from the connection member in the axial connection condition, the engagement projection retained in the terminal end portion of the reception groove formed in the outer member of the second cable is pushed in the circumferential direction from the terminal end portion of the reception groove while guided by the terminal end portion of the insertion groove that is formed in the connection member so as to reach the terminal end portion of the insertion groove such that the engagement projection is released from a condition in which axial movement thereof with respect to the outer member of the second cable is restrained and the axial connection condition can be canceled.

3. The cable connection structure as defined in claim 1, wherein the terminal end portion of at least one of the insertion groove formed in the connection member and the reception groove formed in the outer member of the second cable is shaped so as to be circumferentially curved.

4. The cable connection structure as defined in claim 1, wherein a plurality of engagement projections are formed in the connection end portion of the inner member of the first cable so as to be axisymmetrical with each other, and wherein a plurality of insertion grooves and reception grooves that engage the engagement projections are axisymmetrically formed so as to correspond to the engagement projections.

5. The cable connection structure as defined in claim 1, wherein the first cable is disposed in a seat back of a vehicle seat and the second cable is disposed in a tubular stay of a headrest that is attached to an upper portion of the seat back, wherein a cylindrical support into which the stay is inserted is disposed on the upper portion of the seat back as the connection member, wherein when the connection end portion of the first cable is inserted into the cylindrical support from below, the engagement projection formed in the connection end portion of the inner member thereof engages the terminal end portion of the insertion groove that is formed in the support so that the first cable is maintained in a condition in which the first cable is suspended in the cylindrical support, wherein the tubular stay is formed as the outer member of the second cable and a push rod as the inner member is inserted into the tubular stay, wherein when the tubular stay is inserted into the cylindrical support from above, the engagement projection formed in the connection end portion of the inner member of the first cable is inserted into the reception groove formed in a lower end portion of the stay so as to engage the terminal end portion thereof such that the inner member of the first cable and the stay can be axially connected and positioned in the axial connection condition in which the inner member and the stay can axially move while integrated with each other, and a head portion formed in the outer member of the first cable is positioned closer to a lower end portion of the push rod that is inserted in the tubular stay so that the head portion and the push rod can be positioned in an axial connection condition in which the head can axially push the push rod, and wherein when the stay is pulled from the support from above, the axial connection condition of the inner member of the first cable and the stay is canceled.

6. The cable connection structure as defined in claim 5, wherein the headrest is constructed such that a support portion for receiving a head of a sitting person can move relative to the seat back in a direction toward the head during a vehicle back-side collision, and wherein the first cable and the second cable are provided as a transmission member for transmitting a mechanical operational movement detected when the vehicle back-side collision occurs to a mechanical portion for moving the support portion.

* * * * *